US012757158B2

(12) United States Patent
Jia et al.

(10) Patent No.: US 12,757,158 B2
(45) Date of Patent: Oct. 6, 2026

(54) COMMUNICATION METHOD AND APPARATUS

(71) Applicant: Huawei Technologies Co., Ltd., Shenzhen (CN)

(72) Inventors: Jianxin Jia, Shanghai (CN); Wenfu Wu, Shanghai (CN); Zaifeng Zong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 18/816,400

(22) Filed: Aug. 27, 2024

(65) Prior Publication Data

US 2024/0422726 A1 Dec. 19, 2024

Related U.S. Application Data

(63) Continuation of application No. PCT/CN2023/077946, filed on Feb. 23, 2023.

(30) Foreign Application Priority Data

Feb. 28, 2022 (CN) ......................... 202210191869.3

(51) Int. Cl.
*H04W 64/00* (2009.01)
*H04W 48/16* (2009.01)

(52) U.S. Cl.
CPC ......... *H04W 64/003* (2013.01); *H04W 48/16* (2013.01)

(58) Field of Classification Search
CPC ... H04W 64/003; H04W 48/16; H04W 12/02; H04W 4/02
See application file for complete search history.

(56) References Cited

U.S. PATENT DOCUMENTS 10,477,340 B2 * 11/2019 Edge ........................ H04W 4/02
11,357,062 B2 6/2022 Ma et al.
(Continued)

FOREIGN PATENT DOCUMENTS

CN 110167191 A 8/2019
CN 110999330 A 4/2020
(Continued)

OTHER PUBLICATIONS

"3rd Generation Partnership Project; Technical Specification Group Services and System Aspects; 5G System (5GS) Location Services (LCS); Stage 2 (Release 17)," 3GPP TS 23.273 V17.3.0, Dec. 2021, total 99 pages.

(Continued)

*Primary Examiner* — Dhaval V Patel
(74) *Attorney, Agent, or Firm* — Slater Matsil, LLP

(57) ABSTRACT

In accordance with an embodiment, a method includes: receiving, by an access management network element, a first message, wherein the first message comprises a positioning request of a terminal device, or the first message comprises a location information request corresponding to the terminal device; and sending, by the access management network element, a second message to a first core network element, wherein the second message is configured to request to establish or update a first user plane connection, or the second message is configured to request to select the first user plane connection, wherein the first user plane connection is used to transmit positioning information of the terminal device, and the second message comprises a location service identifier.

20 Claims, 20 Drawing Sheets

(56) References Cited

U.S. PATENT DOCUMENTS

| | | | | |
|---|---|---|---|---|
| 12,166,826 | B2 * | 12/2024 | Zhang | H04L 67/141 |
| 2020/0374661 | A1 * | 11/2020 | Ma | H04W 64/00 |
| 2021/0360371 | A1 * | 11/2021 | Qiao | H04W 4/029 |
| 2025/0151013 | A1 * | 5/2025 | Wang | H04W 64/00 |

FOREIGN PATENT DOCUMENTS

| | | | | |
|---|---|---|---|---|
| WO | 2021196031 | A1 | 10/2021 | |
| WO | WO-2021217377 | A1 * | 11/2021 | H04W 64/00 |
| WO | 2022110209 | A1 | 6/2022 | |

OTHER PUBLICATIONS

5G; 5G System; Session Management Services; Stage 3 (3GPP TS 29.502 version 16.4.0 Release 16), ETSI TS 129 502 V16.4.0 (Jul. 2020), total 258 pages.

* cited by examiner

COMMUNICATION METHOD AND APPARATUS

CROSS-REFERENCE TO RELATED APPLICATIONS

This application is a continuation of International Application No. PCT/CN2023/077946, filed on Feb. 23, 2023, which claims priority to Chinese Patent Application No. 202210191869.3, filed on Feb. 28, 2022. The disclosures of the aforementioned applications are hereby incorporated by reference in their entireties.

TECHNICAL FIELD

This application relates to the field of communication technologies, and in particular, to a communication method and apparatus.

BACKGROUND

Because a user equipment (UE) may move along with movement of a user in a wireless network, a network side needs to obtain a location of a terminal device in real time or irregularly, to carry out a service related to the terminal device.

Currently, in a process of a positioning service for the UE, positioning data of the UE passes through a public network core network element. Therefore, there is a risk of exposing the positioning data of the UE. Therefore, currently, security of the positioning service for the UE needs to be improved.

SUMMARY

This application provides a communication method and apparatus, to improve security of a positioning service procedure of a terminal device.

According to a first aspect, this application provides a communication method. The communication method may be implemented by an access management network element or a component in an access management network element, and the component is, for example, at least one of a processor, a transceiver, a processing module, or a transceiver module. The access management network element may include a 5G core network element, for example, an access and mobility management function (AMF) network element. An example in which an execution body is the access management network element is used. The method includes: The access management network element receives a first message, where the first message includes a positioning request of a terminal device, or the first message includes a location information request corresponding to a terminal device. The access management network element sends a second message to a first core network element, where the second message is for requesting to establish or update a first user plane connection; or the second message is for requesting to select a first user plane connection, the first user plane connection is used to transmit positioning information of the terminal device, and the second message includes a location service identifier.

According to the method, after receiving the first message, the access management network element may initiate, to the first core network element, a request for establishing or updating the first user plane connection, or request the first core network element to select the first user plane network element, to support transmission of the related positioning information of the terminal device by using the first user plane network element, and avoid a risk of exposing positioning data of the positioning information of the terminal device.

Optionally, a part described in "the method further includes" may be replaced with any one of the following descriptions:

"the access management network element receives a first message, where the first message includes a positioning request of a terminal device, or the first message includes a location information request corresponding to a terminal device; and the access management network element may further send a second message to a first core network element, where the second message is for requesting to establish or update a first user plane connection; or the second message is for requesting to select a first user plane connection, and the first user plane connection is used to transmit positioning information of the terminal device";

"the access management network element receives a first message, where the first message includes a positioning request of one or more terminal devices, or the first message includes a location information request corresponding to one or more terminal devices; and the access management network element may further send a second message to a first core network element, where the second message is for requesting to establish or update a first user plane connection; or the second message is for requesting to select a first user plane connection, and the first user plane connection is used to transmit positioning information of the one or more terminal devices"; or "the access management network element receives a first message, where the first message includes a positioning request of one or more terminal devices, or the first message includes a location information request corresponding to one or more terminal devices; and the access management network element may further send a second message to a first core network element, where the second message is for requesting to establish or update a first user plane connection; or the second message is for requesting to select a first user plane connection, the first user plane connection is used to transmit positioning information of the one or more terminal devices, and the second message includes a location service identifier".

It should be noted that "the first message includes a location information request corresponding to a terminal device" may be explained as follows: "The first message is for requesting location information of the terminal device". Alternatively, a location information request corresponding to a terminal device may be for requesting location information of the terminal device.

In this application, the positioning request of the terminal device may include a UE originated positioning request (mobile originated location request, MO-LR) message. The location information request corresponding to the terminal device may include a UE terminated location request (mobile terminated location request, MT-LR) message, for example, include a location information provision positioning request (Namf_Location_ProvidePositioningInfo Request) sent by a GMLC.

"A radio resource control (RRC) message" in this application may be replaced with "a radio message", "a radio resource message", or the like.

In this application, "the positioning information (Positioning Message)" may be replaced with "location information (Location message/Location information)", for example, may be long term evolution positioning protocol information (Long Term Evolution Positioning Protocol message, LPP message), new radio positioning protocol A information (NR Positioning Protocol A, NRPP message), new radio positioning information (New Radio Positioning message, NRP message), new radio positioning protocol information (New Radio Positioning Protocol message, NRPP message), new radio advance positioning information (New Radio Advance Positioning Protocol message, NRAPP message), an LPP protocol data unit (PDU) (LPP PDU), a positioning protocol PDU (PP PDU), a new radio positioning protocol PDU (NPP PDU), or a new radio advance positioning protocol PDU (NRAPP PDU).

The first user plane connection in this application may include an internet protocol (IP) connection, a general packet radio service (GPRS) tunneling protocol (GPRS tunneling protocol, GTP)-user plane (GTP-U) tunnel, a packet data unit (PDU) session, an N3 tunnel corresponding to a PDU session, or a GTP-U tunnel corresponding to a PDU session. This is not specifically limited.

In an example, the second message in this application may include a packet forwarding control protocol (PFCP) session establishment/modification request (PFCP session establishment/modification request).

In addition, in this application, the second message may be used to update a session context, for example, may include a PDU session context update (Nsmf_PDUSession_UpdateSMContext) message. Alternatively, the second message may be used to create a session context, for example, may include a PDU session context creation (Nsmf_PDUSession_CreateSMContext) message.

In an example, the second message may include the location service identifier, to indicate data transmitted in the first user plane connection, and/or a service and/or a UE corresponding to the first user plane connection.

In this application, the location service identifier may include at least one of an LCS correlation identifier (LCS correlation ID), an LCS session identifier (LCS session ID), an eLCS session identifier (eLCS session ID), an eLCS correlation identifier (eLCS correlation ID), an LCS service identifier (LCS service ID), an eLCS service identifier (eLCS service ID), an NRPPa transaction identifier (NRPPa transaction ID), or the like. The location service identifier may alternatively be allocated by the access management network element.

In a possible implementation, the second message further includes at least one of the following information: an identifier of the terminal device, a session management context identifier, a routing identifier, an address of an access network device, first information, or the location service identifier.

Based on this implementation, the access network device may flexibly indicate the terminal device, the session management context, the routing identifier, the access network device, a location service type, or the location service identifier that is associated with the second message, thereby improving location service efficiency.

In this application, the identifier of the terminal device may include a subscription permanent identifier (SUPI), a subscription concealed identifier (SUCI), a general public subscription identifier (generic public subscription identifier, GPSI), a permanent equipment identifier (PEI), an international mobile subscriber identity (IMSI), a globally unique temporary identifier (globally unique temporary identity, GUTI), or the like. This is not limited in this application. The identifier of the terminal device may further include an NG application protocol (NGAP) identifier (NGAP UE ID). The NGAP UE ID may include a RAN NGAP UE ID allocated by the access network device (for example, a RAN NGAP UE ID allocated by a RAN to the UE after the first message is received) and/or an AMF NGAP UE ID allocated by a public network AMF.

In this application, the session management context identifier (Session Management context ID, SM context ID) may be replaced with a session management identifier (Session Management ID, SM ID), and may identify a positioning session, a PDU session, or the like.

The routing identifier (routing ID) may be an identifier of a second core network element. The identifier of the second core network element is, for example, an identifier of a campus network element, for example, may be an identifier of an LMF, or an identifier of an LMF collocated with another campus device. The identifier may be a fully qualified domain name (FQDN), an IP address, a network instance identifier (network instance ID), a network element name, a device name, a uniform resource identifier (URI), a uniform resource locator (URL), a location service correlation identifier (LCS correlation ID), or the like.

The address of the access network device may include an IP address of the access network device, and tunnel information (Access Network Tunnel Information, AN Tunnel Info) of the access network device.

The first information indicates a location service.

In this application, "the first information indicates a location service" may be replaced with any one of the following descriptions:

"the first information indicates a position service";

"the first information indicates a location-based service";

"the first information indicates a location service";

"the first information indicates a positioning service"; or

"the first information indicates a to business (to B) service".

The first information may be, for example, one or more information elements (IEs); or may be a parameter, for example, may be a data network name (DNN), network slice selection assistance information (NSSAI), a session identifier (for example, a PDU session identifier (PDU session ID)), or a location session identifier (LCS session ID/Location session ID/Positioning session ID).

In a possible implementation, the access management network element may send a third message to the second core network element, where the third message is for requesting the positioning information of the terminal device, and the third message includes the location service identifier, or includes the location service identifier and at least one of the following information: the identifier of the terminal device, access network user plane connection information of the first user plane connection, or core network user plane connection information of the first user plane connection.

Based on this implementation, the second core network element may send the positioning information to the access network device, or the second core network element may send the positioning information to the access network device by using a third core network element, to improve communication reliability.

In this application, "the access management network element sends a third message to the second core network element, where the third message is for requesting the positioning information of the terminal device, and the third message includes the location service identifier, or includes the location service identifier and at least one of the following information: the identifier of the terminal device, access network user plane connection information of the first user plane connection, or core network user plane connection information of the first user plane connection" may alternatively be replaced with any one of the following descriptions:

"the access management network element sends the location service identifier to the second core network element, or sends the location service identifier and at least one of the following information: the identifier of the terminal device, access network user plane connection information of the first user plane connection, or core network user plane connection information of the first user plane connection";

"the access management network element sends, to the second core network element, the location service identifier and at least one of the following information: the identifier of the terminal device, access network user plane connection information of the first user plane connection, or core network user plane connection information of the first user plane connection";

"the access management network element sends at least one of the location service identifier, the identifier of the terminal device, access network user plane connection information of the first user plane connection, or core network user plane connection information of the first user plane connection to the second core network element"; or "the access management network element sends a third message to the second core network element, where the third message includes at least one of the location service identifier, the identifier of the terminal device, access network user plane connection information of the first user plane connection, or core network user plane connection information of the first user plane connection".

The access network user plane connection information of the first user plane connection, including but not limited to the positioning information, may be sent to the access network device. For example, the access network user plane connection information of the first user plane connection may include tunnel information (RAN/AN tunnel information, RAN/AN tunnel Info) allocated by the access network device and/or address information of the access network device. The address information of the access network device is, for example, an IP address of the access network device.

The core network user plane connection information of the first user plane connection may be sent to the third core network element. For example, the core network user plane connection information of the first user plane connection may include tunnel information (Core Network tunnel information, CN tunnel information) allocated by the third core network element and/or information about the third core network element.

In this application, the third core network element may be configured to transmit the positioning information to the access network device through the first user plane connection. In other words, the first user plane connection may be a user plane connection between the third core network element and the access network device. In other words, the third core network element may be a core network side endpoint network element of the first user plane connection. For example, the third core network element may be a user plane network element, for example, a user plane function (UPF) network element; or the third core network element may be a location management network element, for example, a location management function (LMF) network element.

In an example, the core network user plane connection information of the first user plane connection may include core network tunnel information of the first user plane connection, for example, core network tunnel information (CN tunnel Info) allocated by an SMF or the UPF, or LMF tunnel information (LMF tunnel Info) or tunnel information (tunnel Info) allocated by the LMF. Alternatively, the core network user plane connection information of the first user plane connection may include the information about the third core network element, for example, address information, including address information of the UPF or the LMF. Optionally, the CN tunnel Info may include a tunnel endpoint identifier (TEID) and the address information of the UPF, and the LMF tunnel Info or the tunnel Info may include the TEID and the address information of the LMF.

The address information in this application may include the IP address.

In a possible implementation, the access management network element may further receive second information from the first core network element. The second information includes the location service identifier, or includes the location service identifier and at least one of the following information: the identifier of the terminal device or the core network user plane connection information of the first user plane connection.

Based on this implementation, the access management network element may obtain at least one of the core network user plane connection information of the first user plane connection, the identifier of the terminal device, or the location service identifier from the first core network element. In this way, the access network device can successfully send the related positioning information of the terminal device based on the second information through the first user plane connection, thereby improving communication reliability.

In an example, the second information may be carried in a reply message of the second message. In this application, the reply message may also be referred to as a feedback message or a response message.

In another example, the reply message may include at least one of the location service identifier, the identifier of the terminal device, or the core network user plane connection information of the first user plane connection.

In a possible implementation, the access management network element may further send the second information to the access network device.

Based on this implementation, the access management network element may forward the second information to the access network device, so that the access network device can successfully send the related positioning information of the terminal device based on the second information through the first user plane connection, thereby improving communication reliability.

In this application, "the access management network element sends the second information to the access network device" may be replaced with at least one of the following:

"the access management network element sends the location service identifier and the second information to the access network device";

"the access management network element sends the location service identifier, the identifier of the terminal device, or the core network user plane connection information of the first user plane connection to the access network device"; or "the access management network element sends the location service identifier, the identifier of the terminal device, or the core network user plane connection information of the first user plane connection to the access network device based on the second information".

In other words, content sent by the access management network element to the access network device is not necessarily completely the same as the second information. For example, when the core network user plane connection information of the first user plane connection is sent to the access network device by using a UE granularity message, the identifier of the terminal device does not need to be carried. In this application, the UE granularity message may alternatively be replaced with a UE associated message, and a non-UE granularity message may be replaced with a non-UE associated message.

In a possible implementation, the access management network element receives third information from the access network device, where the third information includes the location service identifier, or includes the location service identifier and at least one of the following information: the identifier of the terminal device or the access network user plane connection information of the first user plane connection.

Based on this implementation, the access management network element may obtain, from the access network device, the third information including at least one of the location service identifier, the identifier of the terminal device, or the access network user plane connection information of the first user plane connection. The third information may be used to send information to the access network device through the first user plane connection.

In this application, "the access management network element receives third information from the access network device, where the third information includes the location service identifier, or includes the location service identifier and at least one of the following information: the identifier of the terminal device or the access network user plane connection information of the first user plane connection" may alternatively be replaced with:

"the access management network element receives third information from the access network device, where the third information includes at least one of the location service identifier, the identifier of the terminal device, or the access network user plane connection information of the first user plane connection"; or may alternatively be replaced with:

"the access management network element receives, from the access network device, at least one of the location service identifier, the identifier of the terminal device, or the access network user plane connection information of the first user plane connection".

In a possible implementation, the access management network element sends the third information to the first core network element.

Based on this implementation, the access management network element may send the third information to the first core network element, and the first core network element forwards the third information to the second core network device or the third core network device, so that the second core network device or the third core network device successfully sends the related positioning information of the terminal device to the access network device based on the third information through the first user plane connection, thereby improving communication reliability.

In this application, "the access management network element sends the third information to the first core network element" may alternatively be replaced with any one of the following descriptions:

"the access management network element sends the at least one of the location service identifier, the identifier of the terminal device, or the access network user plane connection information of the first user plane connection to the first core network element"; or "the access management network element sends the location service identifier, the identifier of the terminal device, or the core network user plane connection information of the first user plane connection to the first core network element based on the third information".

That is, the location service identifier may be used as an optional option in this implementation.

In a possible implementation, the first core network element in this application includes a campus network element (or a campus device), or the first core network element is a campus network device.

Based on this implementation, the campus network device may be used as the first core network element, to further improve communication efficiency, and further prevent exposure of location service-related information of the terminal device to a core network.

In this application, "the first network device is a campus network device" may be replaced with: the first network device is deployed in a campus; or may be replaced with: the first network device belongs to/is located inside a campus.

"A campus network or the campus" in this application may be replaced with any one of the following terms, which is not limited:

a non-public network (NPN), a non-carrier network, a factory network, a vertical industry network (vertical network), an edge network, an edge hosting environment, an edge computing network (Edge computing network), a premises network, or a premise.

"A public network, a non-campus network, or a non-campus" in this application may be replaced with any one of the following terms, which is not limited:

a public network or a carrier network.

According to a second aspect, an embodiment of this application provides a communication method. The communication method may be implemented by a first core network element or a component in a first core network element, and the component is, for example, at least one of a processor, a transceiver, a processing module, or a transceiver module. The first core network element is, for example, a session management network element (for example, an SMF) or a location management network element (for example, an LMF). An example in which an execution body is the first core network element is used. The method includes: The first core network element receives a second message from an access management network element, where the second message is for requesting to establish or update a first user plane connection; or the second message is for requesting to select a first user plane connection, the first user plane connection is used to transmit positioning information of a terminal device, and the second message includes a location service identifier. The first core network element may further send second information to the access management network element, where the second information includes the location service identifier, or includes the location service identifier and at least one of the following information: an identifier of the terminal device, core network user plane connection information of the first user plane connection, or a session identifier.

Optionally, a part described in "the method further includes" may be replaced with any one of the following descriptions:

"the first core network element receives a second message from an access management network element, where the second message is for requesting to establish or update a first user plane connection; or the second message is for requesting to select a first user plane connection, the first user plane connection is used to transmit positioning information of a terminal device";

"the first core network element receives a second message from an access management network element, where the second message is for requesting to establish or update a first user plane connection; or the second message is for requesting to select a first user plane connection, the first user plane connection is used to transmit positioning information of one or more terminal devices"; or "the first core network element receives a second message from an access management network element, where the second message is for requesting to establish or update a first user plane connection; or the second message is for requesting to select a first user plane connection, the first user plane connection is used to transmit positioning information of one or more terminal devices, and the second message includes a location service identifier".

In a possible implementation, the second message further includes at least one of the following information: the identifier of the terminal device, a session management context identifier, a routing identifier, an address of an access network device, or first information, and the first information indicates a location service. For the second message, refer to descriptions in the first aspect.

In a possible implementation, the second information is carried in a reply message of the second message. For descriptions of the reply message of the second message and the second information, refer to descriptions in the first aspect. The first core network element may alternatively send the second information, or send at least one of the location service identifier, the identifier of the terminal device, or the core network user plane connection information of the first user plane connection.

The session identifier may be, for example, a PDU session identifier (PDU session ID) or a positioning session identifier (LCS session ID/Location session ID/Positioning session ID).

In a possible implementation, the core network user plane connection information of the first user plane connection includes core network tunnel information of the first user plane connection and/or information about a third core network element, and the third core network element is configured to transmit the positioning information to the access network device through the first user plane connection. For the core network tunnel information of the first user plane connection, refer to descriptions in the first aspect. Details are not described herein again.

In a possible implementation, if the core network user plane connection information includes the core network tunnel information, the first core network element may send a fourth message to the third core network element, where the fourth message is used to establish or update the first user plane connection, the fourth message includes the location service identifier, and the third core network element is configured to transmit the positioning information to the access network device through the first user plane connection.

In this implementation, optionally, the fourth message may include the core network tunnel information of the first user plane connection. In this case, the core network tunnel information of the first user plane connection may be allocated by the first core network element.

Optionally, "the first core network element may send a fourth message to the third core network element, where the fourth message is used to establish or update the first user plane connection, the fourth message includes the location service identifier, and the third core network element is configured to transmit the positioning information to the access network device through the first user plane connection; and the fourth message may include the core network tunnel information of the first user plane connection" may alternatively be replaced with any one of the following:

"the first core network element may send a fourth message to the third core network element, where the fourth message includes the location service identifier and the core network tunnel information of the first user plane connection, and the third core network element is configured to transmit the positioning information to the access network device through the first user plane connection";

"the first core network element may send the location service identifier and the core network tunnel information of the first user plane connection to the third core network element, and the third core network element is configured to transmit the positioning information to the access network device through the first user plane connection"; or "the first core network element may send a fourth message to the third core network element, where the fourth message is used to establish or update the first user plane connection, and the third core network element is configured to transmit the positioning information to the access network device through the first user plane connection", and the fourth message may include the core network tunnel information of the first user plane connection.

Alternatively, the first core network element may further receive the core network tunnel information of the first user plane connection from the third core network element. In this case, the core network tunnel information of the first user plane connection is allocated by the third core network element.

Optionally, the implementation may be alternatively replaced with: the first core network element may send a fourth message to the third core network element, where the fourth message is used to establish or update the first user plane connection, the fourth message includes the location service identifier, and the third core network element is configured to transmit the positioning information to the access network device through the first user plane connection. That is, the fourth message is not sent on a premise or condition that the core network user plane connection information of the first user plane connection includes the core network tunnel information.

In a possible implementation, the fourth message includes the location service identifier, or includes the location service identifier and at least one of the following information:

the identifier of the terminal device, an identifier of the first core network element or an identifier of a second core network element, or access network user plane connection information of the first user plane connection.

The location service identifier, the identifier of the terminal device, an identifier of the first core network element or an identifier of a second core network element, or access network user plane connection information of the first user plane connection. The fourth message may be a packet forwarding control protocol session establishment (PFCP session establishment) message, a PFCP session modification message, an N4 session establishment message, an N4 session modification message, or the like.

In a possible implementation, the first core network element may further receive third information from the access management network element, and send the third information to the third core network element, and the third core network element is configured to transmit the positioning information to the access network device through the first user plane connection. The third information includes the location service identifier, or includes the location service identifier and at least one of the following information: the identifier of the terminal device or the access network user plane connection information of the first user plane connection.

For descriptions of the third information, refer to descriptions in the first aspect. The first core network element may alternatively send at least one of the location service identifier, the identifier of the terminal device, or the access network user plane connection information of the first user plane connection to the third core network element.

In a possible implementation, the first core network element includes a campus network element. For descriptions of the campus network element, refer to the first aspect.

For beneficial effects of the second aspect and any possible implementation of the second aspect, refer to descriptions of beneficial effects of the corresponding implementations of the first aspect.

According to a third aspect, an embodiment of this application provides a communication method. The communication method may be implemented by a second core network element or a component in a second core network element, and the component is, for example, at least one of a processor, a transceiver, a processing module, or a transceiver module. The second core network element may include a location management network element, for example, an LMF. An example in which an execution body is the second core network element is used. The method includes: The second core network element receives a third message from an access management network element, where the third message is for requesting positioning information of a terminal device, and the third message includes a location service identifier, or includes a location service identifier and at least one of the following information: an identifier of the terminal device, access network user plane connection information of a first user plane connection, or core network user plane connection information of a first user plane connection, where the first user plane connection is used to transmit the positioning information of the terminal device. The second core network element may send a fifth message or a sixth message based on the third message.

Optionally, a part described in "the method further includes" may be replaced with any one of the following descriptions:

"the second core network element receives second information from an access management network element, where the second information includes a location service identifier, or includes a location service identifier and at least one of the following information: an identifier of a terminal device, access network user plane connection information of a first user plane connection, or core network user plane connection information of a first user plane connection, where the first user plane connection is used to transmit positioning information of the terminal device";

"the second core network element receives, from an access management network element, a location service identifier and at least one of the following information: an identifier of a terminal device, access network user plane connection information of a first user plane connection, or core network user plane connection information of a first user plane connection, where the first user plane connection is used to transmit positioning information of the terminal device";

"the second core network element receives at least one of a location service identifier, an identifier of a terminal device, access network user plane connection information of a first user plane connection, or core network user plane connection information of a first user plane connection that is sent by an access management network element, where the first user plane connection is used to transmit positioning information of the terminal device"; or "the second core network element receives a third message from an access management network element, where the third message includes at least one of a location service identifier, an identifier of a terminal device, access network user plane connection information of a first user plane connection, or core network user plane connection information of a first user plane connection, where the first user plane connection is used to transmit positioning information of the terminal device".

Optionally, "the second core network element may send a fifth message or a sixth message based on the third message" may alternatively be replaced with: "the second core network element sends a fifth message or a sixth message".

For meanings of the third message, the second information, the identifier of the terminal device, the access network user plane connection information of the first user plane connection, the core network user plane connection information of the first user plane connection, and the like, refer to descriptions in the first aspect.

In a possible implementation, the third message includes the core network user plane connection information of the first user plane connection, and the second core network element sends the fifth message to a third core network element based on the core network user plane connection information of the first user plane connection, where the fifth message includes the location service identifier, or includes the location service identifier and the at least one of the following information:

the identifier of the terminal device, the core network user plane connection information of the first user plane connection, or the access network user plane connection information of the first user plane connection.

Optionally, the part described by "the second core network element sends the fifth message to a third core network element based on the core network user plane connection information of the first user plane connection, where the fifth message includes the location service identifier, or includes the location service identifier and the at least one of the following information: the identifier of the terminal device, the core network user plane connection information of the first user plane connection, or the access network user plane connection information of the first user plane connection" may alternatively be replaced with any one of the following descriptions:

"the second core network element sends the fifth message to the third core network element, where the fifth message includes the location service identifier, or includes the location service identifier and the at least one of the following information: the identifier of the terminal device, the core network user plane connection information of the first user plane connection, or the access network user plane connection information of the first user plane connection"; or "the second core network element sends the location service identifier, the identifier of the terminal device, the core network user plane connection information of the first user plane connection, and/or the access network user plane connection information of the first user plane connection to the third core network element".

The fifth message may be an IP message or a GTP-U message. The location service identifier, the identifier of the terminal device, the core network user plane connection information of the first user plane connection, and/or the access network user plane connection information of the first user plane connection may be carried in an extended header or a payload of the fifth message. The payload of the fifth message may further include an NRPPa message or an LPP message. The location service identifier and/or the identifier of the terminal device may be carried in the NRPPa message.

In this implementation, the second core network element may send the fifth message to the third core network element based on the core network user plane connection information of the first user plane connection, so that the third core network element can send positioning information to the access network device through the first user plane connection, and the third core network element can know a terminal device and/or a location service to which the positioning information is related.

In an example, the positioning information may be carried in the NRPPa message or the LPP message, and the NRPPa message or the LPP message may be carried in the fifth message.

In a possible implementation, the third message includes the access network user plane connection information of the first user plane connection, and the second core network element sends the sixth message based on the access network user plane connection information of the first user plane connection, where the sixth message includes the location service identifier, or includes the location service identifier and the identifier of the terminal device.

The sixth message may be an IP message or a GTP-U message. The location service identifier and/or the identifier of the terminal device may be carried in an extended header or a payload of the sixth message. The payload of the sixth message may further include an NRPPa message or an LPP message. The location service identifier and/or the identifier of the terminal device may be carried in the NRPPa message or the LPP message.

In this implementation, the second core network element may send the sixth message to the access network device based on the access network user plane connection information of the first user plane connection, to transmit the positioning information of the terminal device through the first user plane connection.

In an example, the positioning information may be carried in the NRPPa message or the LPP message, and the NRPPa message or the LPP message may be carried in the sixth message.

For beneficial effects of the third aspect and any possible implementation of the third aspect, refer to descriptions of beneficial effects of the corresponding implementations of the first aspect.

According to a fourth aspect, an embodiment of this application provides a communication method. The communication method may be implemented by a third core network element or a component in a third core network element, and the component is, for example, at least one of a processor, a transceiver, a processing module, or a transceiver module. The third core network element is, for example, a user plane network element, for example, a UPF. An example in which an execution body is the third core network element is used. The method includes: The third core network element receives a fourth message from a first core network element, where the fourth message is used to establish or update a first user plane connection, the first user plane connection is used to transmit positioning information of a terminal device, the fourth message includes a location service identifier, and the third core network element is configured to transmit the positioning information to an access network device through the first user plane connection. The third core network element sends a reply message of the fourth message to the first core network element, where the fourth message or the reply message includes core network tunnel information of the first user plane connection.

Based on the method, the first core network element or the third core network element may allocate the core network tunnel information of the first user plane connection, to improve communication efficiency.

Optionally, "the third core network element sends a reply message of the fourth message to the first core network element, where the fourth message or the reply message includes core network tunnel information of the first user plane connection" may alternatively be replaced with: "the fourth message further includes core network tunnel information of the first user plane connection; or the method further includes: The third core network element sends the core network tunnel information of the first user plane connection to the first core network element".

Optionally, if the fourth message further includes core network tunnel information of the first user plane connection, a part described in "the method further includes" may alternatively be replaced with any one of the following descriptions:

"the third core network element receives the fourth message from the first core network element, where the fourth message includes core network tunnel information of the first user plane connection, the first user plane connection is used to transmit the positioning information of the terminal device, and the third core network element is configured to transmit the positioning information to the access network device through the first user plane connection";

"the third core network element receives the fourth message from the first core network element, where the fourth message includes the location service identifier and core network tunnel information of the first user plane connection, the first user plane connection is used to transmit the positioning information of the terminal device, and the third core network element is configured to transmit the positioning information to the access network device through the first user plane connection"; or "the third core network element receives the location service identifier and core network tunnel information of the first user plane connection from the first core network element, the first user plane connection is used to transmit the positioning information of the terminal device, and the third core network element is configured to transmit the positioning information to the access network device through the first user plane connection".

Alternatively, the third core network element may alternatively send core network tunnel information of the first user plane connection to the first core network element.

In a possible implementation, the fourth message includes the location service identifier, or includes the location service identifier and at least one of the following information:

an identifier of the terminal device, an identifier of the first core network element or an identifier of a second core network element, or access network user plane connection information of the first user plane connection. For explanations of the fourth message, refer to explanations in this application. Details are not described herein again.

In a possible implementation, the third core network element receives third information from the first core network element, where the third information includes the location service identifier, or includes the location service identifier and at least one of the following information: the identifier of the terminal device or the access network user plane connection information of the first user plane connection.

In this application, "the third core network element receives third information from the first core network element, where the third information includes the location service identifier, or includes the location service identifier and at least one of the following information: the identifier of the terminal device or the access network user plane connection information of the first user plane connection" may alternatively be replaced with:

"the third core network element receives third information from the first core network element, where the third information includes at least one of the location service identifier, the identifier of the terminal device, or the access network user plane connection information of the first user plane connection"; or may alternatively be replaced with:

"the third core network element receives at least one of the location service identifier, the identifier of the terminal device, or the access network user plane connection information of the first user plane connection from the first core network element".

In a possible implementation, the third core network element may receive a fifth message from the second core network element, where the fifth message includes the location service identifier, or includes the location service identifier and at least one of the following:

the identifier of the terminal device, core network user plane connection information of the first user plane connection, or the access network user plane connection information of the first user plane connection. The third core network element sends the fifth message to the access network device based on the identifier of the terminal device, the location service identifier, the access network user plane connection information of the first user plane connection, and/or the core network user plane connection information of the first user plane connection.

Optionally, the part described by "the third core network element may receive a fifth message from the second core network element, where the fifth message includes the location service identifier, or includes the location service identifier and the identifier of the terminal device" may alternatively be replaced with any one of the following descriptions:

"the third core network element may receive a fifth message from the second core network element, where the fifth message includes the location service identifier, or includes the location service identifier and the at least one of the following:

the identifier of the terminal device, the core network user plane connection information of the first user plane connection, or the access network user plane connection information of the first user plane connection"; or "the second core network element sends the location service identifier, the identifier of the terminal device, the core network user plane connection information of the first user plane connection, and/or the access network user plane connection information of the first user plane connection to the third core network element".

Optionally, the part described by "the third core network element sends the fifth message to the access network device based on the access network user plane connection information of the first user plane connection" may alternatively be replaced with any one of the following descriptions:

"the third core network element sends the fifth message to the access network device";

"the third core network element determines the access network user plane connection information of the first user plane connection based on the location service identifier and/or the identifier of the terminal device, and sends the fifth message to the access network device based on the access network user plane connection information of the first user plane connection"; or "the third core network element sends the fifth message to the access network device based on the identifier of the terminal device, the location service identifier, the access network user plane connection information of the first user plane connection, and/or the core network user plane connection information of the first user plane connection".

In a possible implementation, the third core network element sends a seventh message to the second core network element based on the identifier of the terminal device, the location service identifier, the access network user plane connection information of the first user plane connection, the core network user plane connection information of the first user plane connection, and/or the identifier of the second core network element. Explanations of the seventh message are the same as explanations of the fifth message or the sixth message. For example, the seventh message, the fifth message, or the sixth message may be a GTP-U message or an IP message. Details are not described herein again.

For beneficial effects of the fourth aspect and any possible implementation of the fourth aspect, refer to descriptions of beneficial effects of the corresponding implementations of the first aspect.

According to a fifth aspect, an embodiment of this application provides a communication method. The communication method may be implemented by an access network device or a component in an access network device, and the component is, for example, at least one of a processor, a transceiver, a processing module, or a transceiver module. The access network device is, for example, a base station. An example in which an execution body is the access network device is used. The method includes: The access network device receives second information from an access management network element, where the second information includes a location service identifier, or includes a location service identifier and at least one of the following information: an identifier of a terminal device or core network user plane connection information of a first user plane connection.

In addition/Alternatively, the access network device sends third information to the access management network element, where the third information includes the location service identifier, or includes the location service identifier and at least one of the following information: the identifier of the terminal device or access network user plane connection information of the first user plane connection, where the first user plane connection is used to transmit positioning information of the terminal device.

Optionally, the part described by "the access network device receives second information from an access management network element, where the second information includes a location service identifier, or includes a location service identifier and at least one of the following information: an identifier of a terminal device or core network user plane connection information of a first user plane connection" may alternatively be replaced with the following descriptions:

"the access network device receives second information from an access management network element, where the second information includes at least one of a location service identifier, an identifier of a terminal device, or core network user plane connection information of a first user plane connection"; or may be replaced with:

"the access network device receives at least one of a location service identifier, an identifier of a terminal device, or core network user plane connection information of a first user plane connection from an access management network element".

Optionally, the part described by "the access network device sends third information to the access management network element, where the third information includes the location service identifier, or includes the location service identifier and at least one of the following information: the identifier of the terminal device or access network user plane connection information of the first user plane connection" may alternatively be replaced with the following descriptions:

"the access network device sends third information to the access management network element, where the third information includes at least one of the location service identifier, the identifier of the terminal device, or access network user plane connection information of the first user plane connection"; or may alternatively be replaced with:

"the access network device sends at least one of the location service identifier, the identifier of the terminal device, or access network user plane connection information of the first user plane connection to the access management network element".

For beneficial effects of the fifth aspect and any possible implementation of the fifth aspect, refer to descriptions of beneficial effects of the corresponding implementations of the first aspect.

According to a sixth aspect, this application further provides a communication apparatus. The communication apparatus may be an access management network element or a component in an access management network element. The communication apparatus has a function of implementing the method in the first aspect or the possible implementations of the first aspect. The function may be implemented by hardware, or may be implemented by hardware executing corresponding software. The hardware or the software includes one or more modules corresponding to the function.

In a possible implementation, a structure of the communication apparatus includes a communication module and a processing module. These modules or units may perform the corresponding function in the first aspect or the possible implementations of the first aspect. For details, refer to detailed descriptions in the method examples. Details are not described herein again. For example, the communication module may include a receiving module and/or a sending module.

In a possible implementation, a structure of the communication apparatus includes a communication interface and a processor, and optionally further includes a memory. The communication interface is configured to receive and send information or data, and is configured to communicate and interact with another device in a communication network. The processor is configured to support the communication apparatus in performing the corresponding function in the first aspect or the possible implementations of the first aspect. The memory is coupled to the processor, and stores program instructions and data that are necessary for the communication apparatus.

According to a seventh aspect, this application further provides a communication apparatus. The communication apparatus may be a first core network element or a component in a first core network element. The communication apparatus has a function of implementing the method in the second aspect or the possible implementations of the second aspect. The function may be implemented by hardware, or may be implemented by hardware executing corresponding software. The hardware or the software includes one or more modules corresponding to the function.

In a possible implementation, a structure of the communication apparatus includes a communication module and a processing module. These modules or units may perform the corresponding function in the second aspect or the possible implementations of the second aspect. For details, refer to detailed descriptions in the method examples. Details are not described herein again. For example, the communication module may include a receiving module and/or a sending module.

In a possible implementation, a structure of the communication apparatus includes a communication interface and a processor, and optionally further includes a memory. The communication interface is configured to receive and send information or data, and is configured to communicate and interact with another device in a communication network. The processor is configured to support the communication apparatus in performing the corresponding function in the second aspect or the possible implementations of the second aspect. The memory is coupled to the processor, and stores program instructions and data that are necessary for the communication apparatus.

According to an eighth aspect, this application further provides a communication apparatus. The communication apparatus may be a second core network element or a component in a second core network element. The communication apparatus has a function of implementing the method in the third aspect or the possible implementations of the third aspect. The function may be implemented by hardware, or may be implemented by hardware executing corresponding software. The hardware or the software includes one or more modules corresponding to the function.

In a possible implementation, a structure of the communication apparatus includes a communication module and a processing module. These modules or units may perform the corresponding function in the third aspect or the possible implementation examples of the third aspect. For details, refer to detailed descriptions in the method examples. Details are not described herein again. For example, the communication module may include a receiving module and/or a sending module.

In a possible implementation, a structure of the communication apparatus includes a communication interface and a processor, and optionally further includes a memory. The communication interface is configured to receive and send information or data, and is configured to communicate and interact with another device in a communication network. The processor is configured to support the communication apparatus in performing the corresponding function in the third aspect or the possible implementation examples of the third aspect. The memory is coupled to the processor, and stores program instructions and data that are necessary for the communication apparatus.

According to a ninth aspect, this application further provides a communication apparatus. The communication apparatus may be a third core network element or a component in a third core network element. The communication apparatus has a function of implementing the method in the fourth aspect or the possible implementations of the fourth aspect. The function may be implemented by hardware, or may be implemented by hardware executing corresponding software. The hardware or the software includes one or more modules corresponding to the function.

In a possible implementation, a structure of the communication apparatus includes a communication module and a processing module. These modules or units may perform the corresponding function in the fourth aspect or the possible implementation examples of the fourth aspect. For details, refer to detailed descriptions in the method examples. Details are not described herein again. For example, the communication module may include a receiving module and/or a sending module.

In a possible implementation, a structure of the communication apparatus includes a communication interface and a processor, and optionally further includes a memory. The communication interface is configured to receive and send information or data, and is configured to communicate and interact with another device in a communication network. The processor is configured to support the communication apparatus in performing the corresponding function in the fourth aspect or the possible implementation examples of the fourth aspect. The memory is coupled to the processor, and stores program instructions and data that are necessary for the communication apparatus.

According to a tenth aspect, this application further provides a communication apparatus. The communication apparatus may be an access network device or a component in an access network device. The communication apparatus has a function of implementing the method in the fifth aspect or the possible implementations of the fifth aspect. The function may be implemented by hardware, or may be implemented by hardware executing corresponding software. The hardware or the software includes one or more modules corresponding to the function.

In a possible implementation, a structure of the communication apparatus includes a communication module and a processing module. These modules or units may perform the corresponding function in the fifth aspect or the possible implementation examples of the fifth aspect. For details, refer to detailed descriptions in the method examples. Details are not described herein again. For example, the communication module may include a receiving module and/or a sending module.

In a possible implementation, a structure of the communication apparatus includes a communication interface and a processor, and optionally further includes a memory. The communication interface is configured to receive and send information or data, and is configured to communicate and interact with another device in a communication network. The processor is configured to support the communication apparatus in performing the corresponding function in the fifth aspect or the possible implementation examples of the fifth aspect. The memory is coupled to the processor, and stores program instructions and data that are necessary for the communication apparatus.

According to an eleventh aspect, an embodiment of this application provides a communication system, which may include one or more of the communication apparatuses according to the sixth aspect and the seventh aspect and the possible implementations of the sixth aspect and the seventh aspect.

Alternatively, the communication system may include one or more of the communication apparatuses according to the sixth aspect to the eighth aspect and the possible implementations of the sixth aspect to the eighth aspect.

Alternatively, the communication system may include one or more of the communication apparatuses according to the sixth aspect to the ninth aspect and the possible implementations of the sixth aspect to the ninth aspect.

Alternatively, the communication system may include one or more of the communication apparatuses according to the sixth aspect to the tenth aspect and the possible implementations of the sixth aspect to the tenth aspect.

According to a twelfth aspect, an embodiment of this application provides a computer-readable storage medium. The computer-readable storage medium stores program instructions, and when the program instructions are run on a computer, the computer is enabled to perform the method according to any one of the first aspect to the fifth aspect and the possible implementations of the first aspect to the fifth aspect in embodiments of this application. For example, the computer-readable storage medium may be any usable medium that can be accessed by the computer. The following provides an example but does not impose a limitation. The computer-readable medium may include a non-transient computer-readable medium, a random access memory (RAM), a read-only memory (ROM), an electrically erasable programmable read-only memory (electrically EPROM, EEPROM), a CD-ROM or another optical disc storage, a magnetic disk storage medium or another magnetic storage device, or any other medium that can be used to carry or store expected program code in a form of instructions or a data structure and can be accessed by the computer.

According to a thirteenth aspect, an embodiment of this application provides a computer program product, including computer program code or instructions. When the computer program code or the instructions are run on a computer, the method according to any one of the first aspect to the fifth aspect or the possible implementations of the first aspect to the fifth aspect is performed.

According to a fourteenth aspect, this application further provides a chip, including a processor. The processor is coupled to a memory, and is configured to read and execute program instructions stored in the memory, to enable the chip to implement the method according to any one of the first aspect to the fifth aspect or the possible implementations of the first aspect to the fifth aspect.

For each aspect of the second aspect to the fourteenth aspect and technical effects that may be achieved in each aspect, refer to descriptions of beneficial effects of the method according to any one of the first aspect to the fifth aspect and the possible implementations of the first aspect to the fifth aspect. Details are not described herein again.

DETAILED DESCRIPTION OF ILLUSTRATIVE EMBODIMENTS

Figure 1A:
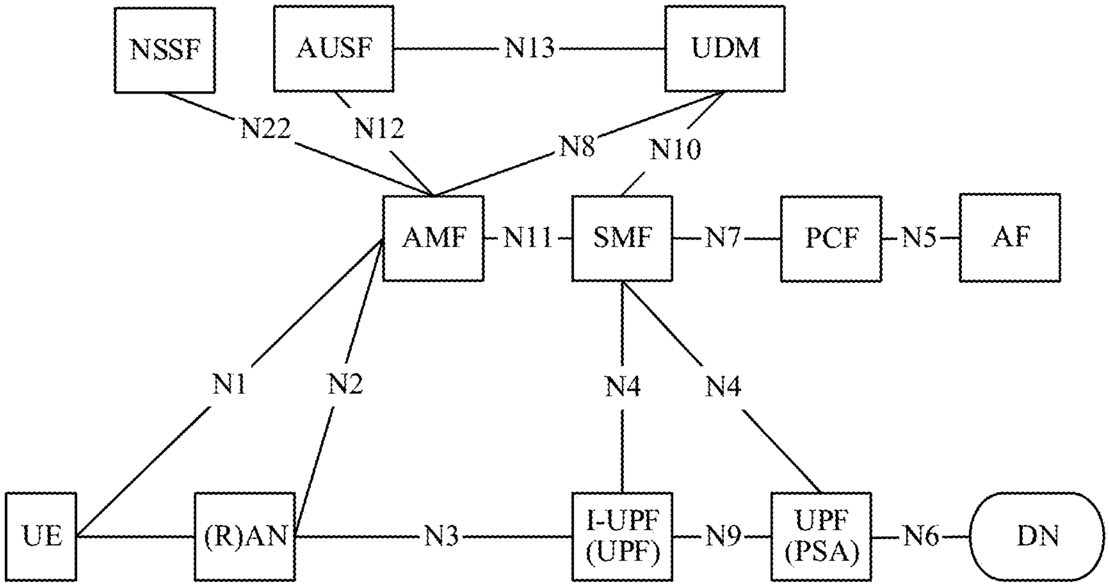
FIG. 1A is a schematic of an architecture of a communication system according to an embodiment of this application.

To make the objectives, technical solutions, and advantages of this application clearer, the following further describes this application in detail with reference to the accompanying drawings.

To facilitate understanding of the technical solutions in this application, the following first briefly describes technical terms in this application.

The following describes some terms in embodiments of this application, to facilitate understanding of a person skilled in the art.

(1) A user equipment, also referred to as a terminal device, is a device having a wireless transceiver function, and may communicate with one or more core network (CN) devices (or may also be referred to as core devices) by using an access network device (or may also be referred to as an access device) in a (radio) access network (radio access network, (R)AN) device.

The user equipment may also be referred to as an access terminal, a terminal, a subscriber unit, a subscriber station, a mobile station, a remote station, a remote terminal, a mobile device, a user terminal, a user proxy, a user apparatus, or the like. The user equipment may be deployed on (deployed in) the land, including an indoor user equipment, an outdoor user equipment, a handheld user equipment, or a vehicle-mounted user equipment; or may be deployed on a water surface (for example, a ship); or may be deployed in the air (for example, on an aircraft, a balloon, or a satellite). The user equipment may be a cellular phone, a cordless phone, a session initiation protocol (SIP) phone, a smartphone, a mobile phone, a wireless local loop (WLL) station, a personal digital assistant (PDA), or the like. Alternatively, the user equipment may be a handheld device with a wireless communication function, a computing device or another device connected to a wireless modem, a vehicle-mounted device, a wearable device, an uncrewed aerial vehicle device, a terminal in an internet of things or an internet of vehicles, a terminal in any form in a 5th-generation (5G) mobile communication network and a future network, a relay user equipment, a terminal in a future evolved PLMN, or the like. The relay user equipment may be, for example, a 5G residential gateway (RG). For example, the user equipment may be a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. A type, a category, or the like of the terminal device is not limited in embodiments of this application.

The user equipment may further include end-side devices, such as a local switch (LSW) and/or a customer premise equipment (CPE), or the user equipment may access a network by using the LSE or the CPE.

In embodiments of this application, a user equipment (UE) that registers with the network may be understood as a user. One UE may correspond to one subscriber identity module (SIM) card. To be specific, when one SIM card is installed in the terminal device, the terminal device corresponds to one user UE; and when a plurality of SIM cards are installed in the terminal device, the terminal device corresponds to a plurality of user UEs.

In this application, a network device is a device that can provide a radio access function for a terminal. The network device may support at least one wireless communication technology, for example, long term evolution (LTE), new radio (NR), or wideband code division multiple access (WCDMA).

For another example, the network device may include a core network (CN) device, and the core network device includes, for example, an AMF.

In this application, the (radio) access network device may be configured to provide a network access function for an authorized user equipment in a specific area, and can use transmission tunnels of different quality based on a level of the user equipment, a service requirement, and the like.

The (R)AN can manage radio resources and provide an access service for the user equipment, to forward a control signal and user equipment data between the user equipment and a core network. The (R)AN may also be understood as a base station in a conventional network.

For example, the access network device in embodiments of this application may be any communication device with a wireless transceiver function for communicating with the user equipment. The access network device includes but is not limited to an evolved NodeB (eNB), a radio network controller (RNC), a NodeB (NB), a base station controller (BSC), a base transceiver station (BTS), a home base station (for example, a home evolved NodeB, HeNB, or a home NodeB, HNB), a baseband unit (BBU), an access point (AP) in a wireless fidelity (Wi-Fi) system, a wireless relay node, a wireless backhaul node, a transmission point (TP), or a transmission reception point (TRP). Alternatively, the access network device may be a gNB or a transmission point (TRP or TP) in a 5G system such as an NR system, may be one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, a gNB may include a central unit (CU) and a DU. The gNB may further include an active antenna unit (AAU). The CU implements some functions of the gNB, and the DU implements some functions of the gNB. For example, the CU is responsible for processing a non-real-time protocol and a service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical layer (physical, PHY). The AAU implements some physical layer processing functions, radio frequency processing, and a function related to an active antenna. Information at the RRC layer eventually becomes information at the PHY layer, or is converted from information at the PHY layer. Therefore, in the architecture, higher layer signaling such as RRC layer signaling may also be considered as being sent by the DU or sent by the DU and the AAU. It may be understood that the access network device may be a device including one or more of a CU node, a DU node, or an AAU node. In addition, the CU may be classified as an access network device in an access network (radio access network, RAN), or the CU may be classified as an access network device in a core network (CN). This is not limited in this application.

User plane network element: is configured to perform packet routing and forwarding, quality of service (QOS) processing on user plane data, and the like.

In a 5G communication system, the user plane network element may be a user plane function (UPF) network element. In a future communication system, the user plane network element may still be the UPF network element, or may have another name. This is not limited in this application.

Data network element: is configured to provide a network for data transmission.

In the 5G communication system, the data network element may be a data network (DN) network element. In a future communication system, the data network element may still be the DN element, or may have another name. This is not limited in this application.

Authentication server: is configured to perform security authentication for users. In the 5G communication system, the authentication server may be an authentication server function (AUSF) network element.

Mobility management network element: is mainly configured to perform mobility management, access management, and the like. In the 5G communication system, the access management network element may be an access and mobility management function (AMF), and mainly performs functions such as mobility management and access authentication/authorization. In addition, the access management network element is further configured to transfer a user policy between a terminal and a policy control function (PCF).

Session management network element: is mainly configured to: manage a session, allocate and manage an internet protocol (IP) address of a user equipment, select an endpoint that can manage a user plane function interface and a policy control and charging function interface, perform downlink data notification, and the like.

In the 5G communication system, the session management network element may be a session management function (SMF) network element, and completes IP address allocation of a terminal, UPF selection, charging and QoS policy control, and the like.

Application network element: In the 5G communication system, the application network element may be an application function (AF) network element, represents an application function of a third party or an operator, is an interface for obtaining external application data in a 5G network, and is mainly configured to transfer a requirement of an application side for a network side.

Unified data management network element: is responsible for management of a user identifier, subscription data, and authentication data, and registration management of a serving network element of a user. In the 5G communication system, the unified data management network element may be a unified data management (UDM).

Policy control network element: includes a user subscription data management function, a policy control function, a charging policy control function, quality of service (Qos) control, and the like, is a unified policy framework for guiding network behavior, and provides policy rule information and the like for a control plane function network element (for example, an AMF network element or an SMF network element).

In the 5G communication system, the policy control network element may be a PCF.

Network function repository function network element: provides a function of storing and selecting network functional entity information for another core network element. In the 5G communication system, the network element may be a network function repository function (NRF) network element.

Network exposure network element: In the 5G communication system, the network exposure network element may be a network exposure function (network element function, NEF) network element, and is mainly configured to expose a service and a capability of a 3GPP network function to the AF, and may also enable the AF to provide information for the 3GPP network function.

Network slice selection function network element: is configured to select a network slice for a UE. In the 5G communication system, the network element may be a network slice selection function (NSSF) network element.

In a future communication system, for example, a 6G communication system, the network element or the device may still use a name of the network element or the device in the 5G communication system, or may have another name. This is not limited in embodiments of this application. Functions of the network element or the device may be completed by one independent network element, or may be jointly completed by several network elements. During actual deployment, network elements in the core network may be deployed on a same physical device or different physical devices. For example, in a possible deployment, the AMF and the SMF may be deployed on a same physical device. For another example, a network element in a 5G core network and a network element in a 4G core network may be deployed on a same physical device. This is not limited in embodiments of this application.

In the 5G communication system, the application network element may be an application function (AF) network element. In the future communication system, the application network element may still be the AF network element, or may have another name. This is not limited in this application.

Figure 1B:
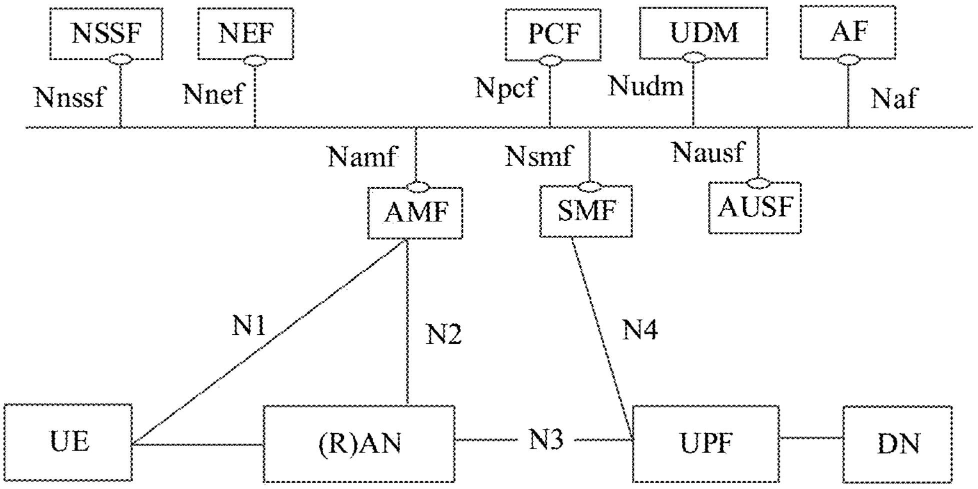
FIG. 1B is a schematic of an architecture of another communication system according to an embodiment of this application.

FIG. 1A and FIG. 1B each are a schematic of an architecture of a 5th generation (5G) network. FIG. 1A is a schematic of an architecture of a 5G network under a non-service-based architecture. FIG. 1B is a schematic of an architecture of a 5G network under a service-based architecture (SBA). The service-based architecture is a basic architecture of the 5G network. "Service-based" is mainly implemented on a control plane. According to three principles of "self-contained, reusable, and self-managed", the essence of the SBA is to define network functions as several "service" modules that can be flexibly invoked. Based on this, a carrier may flexibly customize networking based on a service requirement. Interaction between the network functions is implemented through service invoking. Each network function presents a common service-based interface externally, and can be invoked by an authorized network function or service. FIG. 1B is a schematic of an example of a service-based architecture of a 5G network. In the architecture, a core network element may communicate with another core network element through a service-based interface. For example, a service-based interface corresponding to an AMF is referred to as an Namf interface, and an interface corresponding to an LMF may be referred to as an Nlmf interface.

The 5G network architectures shown in FIG. 1A and FIG. 1B may include three parts: a terminal, a DN, and a carrier network. The following briefly describes functions of some network elements in the 5G network architecture.

The carrier network may include but is not limited to one or more of the following network elements: an AUSF, a PCF, UDM, an AF, an AMF, an SMF network element, a (R)AN device, a UPF, and an NSSF. In the carrier network, a network element or a device other than the radio access network device may be referred to as a core network element or a core network device.

In addition, some communication interfaces shown in FIG. 1A are as follows.

An N1 interface is a signaling-plane interface between the AMF and a UE, and is used to exchange a signaling message between a core network and the UE. For example, the UE registers with a network, the UE establishes a PDU session, and a network side configures a policy for the UE.

An N2 interface is an interface between the AMF and a RAN, and is used to transfer radio bearer control information from the core network to the RAN.

An N3 interface is an interface between the (R)AN and the UPF, and is used to transfer UE service data between the (R)AN and the UPF.

An N4 interface is an interface between the SMF and the UPF, and is used to transfer information between a control plane and a user plane, including that a control plane terminal device completes a network access operation based on subscription information between the control plane terminal device and a carrier.

An N6 interface is an interface between the UPF and the DN, and is used to transfer UE service data between the UPF and the DN.

An N5 interface is an interface between the PCF and the AF.

An N7 interface is an interface between the PCF and the SMF, and is used to deliver a PDU session granularity and a service data flow granularity control policy.

An N8 interface is an interface between the AMF and the UDM, is used by the AMF to obtain access and mobility management-related subscription data and authentication data from the UDM, and is used by the AMF to register current mobility management-related information of the UE with the UDM.

An Ng interface is an interface between two UPFs. For example, as shown in FIG. 1A, the N9 interface is an interface between an intermediate UPF (I-UPF) and a UPF serving as a PDU session anchor (PSA).

An N10 interface is an interface between the SMF and the UDM, is used by the SMF to obtain session management-related subscription data from the UDM, and is used by the SMF to register current session-related information of the UE with the UDM.

An N11 interface is an interface between the SMF and the AMF, and is used to transfer PDU session tunnel information between the RAN and the UPF, a control message sent to the UE, radio resource control information sent to the RAN, and the like.

An N12 interface is an interface between the AMF and AUSF.

An N13 interface is an interface between the AUSF and UDM.

An N22 interface is an interface between the NSSF and AMF.

It may be understood that the foregoing network element or function may be a network element in a hardware device, may be a software function running on dedicated hardware, or may be a virtualized function instantiated on a platform (for example, a cloud platform). Optionally, the network element or function may be implemented by one device, or may be jointly implemented by a plurality of devices, or may be a functional module in one device. This is not specifically limited in embodiments of this application.

A session management network element, a user plane network element, and a mobility management network element in this application may respectively be the SMF, the UPF, and the AMF in FIG. 1A, or may be network elements that have functions of the SMF, the UPF, and the AMF in a future communication network such as a 6th generation (6G) network. This is not limited in this application. In embodiments of this application, an example in which the SMF, the UPF, and the AMF are respectively used as the session management network element, the user plane network element, and the mobility management network element is used for description.

A network architecture used to support a positioning service is provided in current technical specifications. The architecture may be extended based on the architecture shown in FIG. 1A or FIG. 1B. For example, in the architecture shown in FIG. 2, a gateway mobile location center (GMLC) may be configured to: process a positioning request of a location service, and select an appropriate AMF network element for the location service. A location retrieval function (LRF) may be configured with the GMLC or configured separately, and is configured to: retrieve or verify location information of a UE. A location service (LCS) client (LCS client, LCS Client) may send a positioning request to the GMLC through an Le interface between the GMLC and the LCS client, to initiate a positioning service for a UE. During the location service, a location management function (LMF) network element is mainly configured to: manage a positioning request, allocate a positioning resource, and determine a location of a terminal device.

Figure 2:
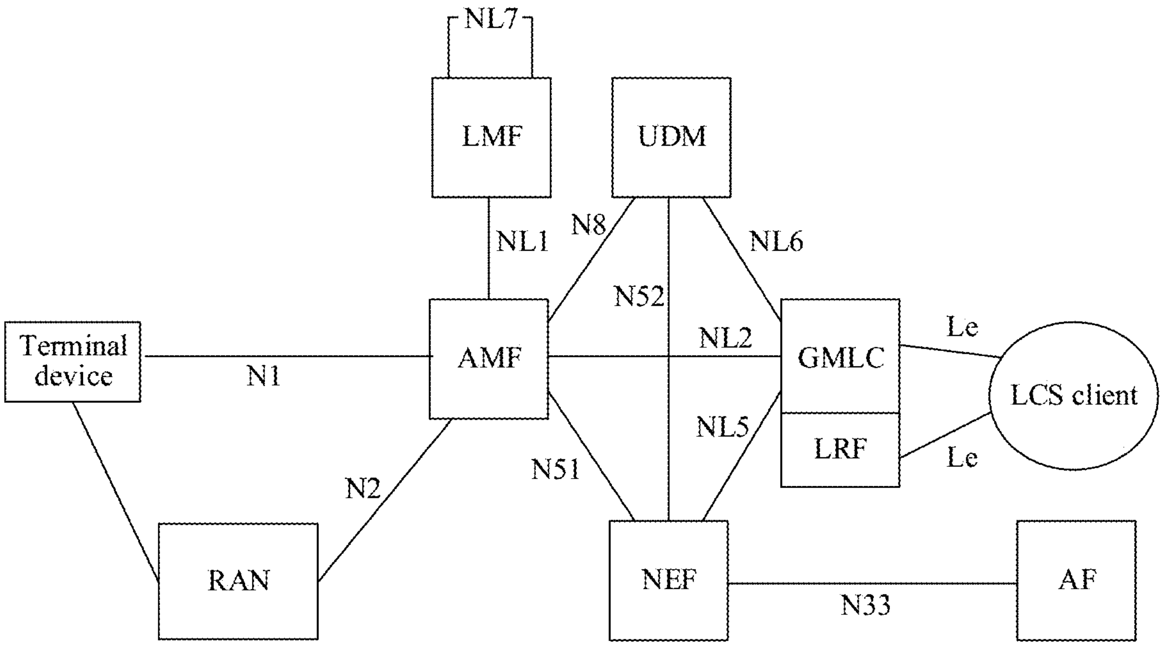
FIG. 2 is a schematic of an architecture of another communication system according to an embodiment of this application.

As shown in FIG. 2, NL1 is an interface between the AMF and the LMF. NL7 is an interface between the LMFs. N52 is an interface between the UDM and the NEF. NL2 is an interface between the AMF and the GMLC. NL5 is an interface between the NEF and the GMLC. N33 is an interface between the NEF and the AF. N51 is an interface between the AMF and the NEF.

Figure 3:
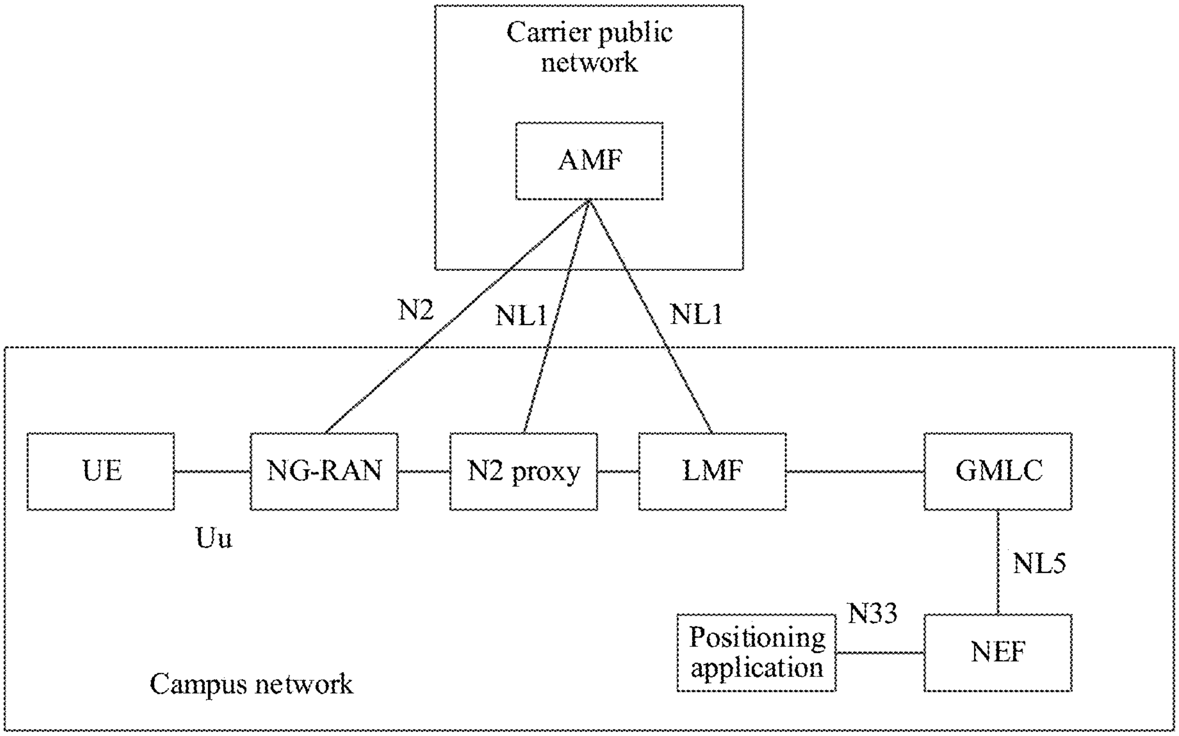
FIG. 3 is a schematic of an architecture of another communication system according to an embodiment of this application.

Usually, compared with a carrier public network core network element (for example, a public network AMF), the LMF is deployed at a location closer to the UE, for example, deployed in a campus (or referred to as a campus network) in which the UE is located. In this application, the campus or the campus network may be replaced with one or a combination of the following: a non-public network (NPN), a non-carrier network, a factory network, a vertical industry network (vertical network), an edge network, an edge hosting environment (Edge Hosting Environment), an edge computing network, a premises network, a premise, or the like. In this application, “a public network, a non-campus network, or a non-campus” may be replaced with any one of the following terms, which is not limited: a public network or a carrier network. For example, as shown in FIG. 3, network elements such as an LMF, a UPF (not shown in FIG. 3), and a GMLC may be deployed in a campus, and are configured to position a UE in the campus. In this application, being deployed in a campus may be replaced with being or belonging to a campus network device or being located inside a campus.

As shown in FIG. 3, an interface between a public network AMF and an N2 campus proxy may be NL1 or N14 (not shown in the figure). An interface between the AMF and a campus LMF may be NL1. NL5 is an interface between the NEF and the GMLC. N33 is an interface between the NEF and a positioning application (for example, an AF).

In a scenario shown in FIG. 3, the UE may access a carrier public network by using an NG-RAN, and a message related to a positioning service event (which may be referred to as a message related to a location service below, for example, a positioning request, positioning information, or a positioning message) is still transmitted by using a public network core network element (for example, the AMF). As a result, positioning data and related information are exposed. Therefore, currently, security of a positioning service for the UE needs to be improved. In addition, the public network AMF is deployed far away from a campus network, and a latency in a process in which the positioning data is transmitted from the AMF to the LMF is excessively high, resulting in a decrease in positioning precision. To prevent the positioning data of the UE from being transmitted out of the campus, and reduce a latency of transmitting the positioning data, how to transmit, through a user plane connection, the message related to the location service is a problem that needs to be resolved in this patent.

In this application, the message related to the location service includes an MO-LR message, an MT-LR message, an LPP message, an NRPP message, an NRPPa message, a new radio positioning (NRP) message, a new radio advance positioning (NRAPP) message, a positioning protocol (PP) message, a new radio positioning protocol PDU (New Radio Positioning, NPP) message, or a new radio advance positioning protocol (NRAPP) message. The positioning event related to the UE may include a positioning event triggered by a UE originated location request (mobile originated location request, MO-LR) message or a positioning event triggered by a UE terminated location request (mobile terminated location request, MT-LR) message. Compared with the MT-LR message, the MO-LR message is originated from the UE. In addition, in this application, the MT-LR message may alternatively be replaced with a location positioning information request. The location positioning information request includes, for example, a location information provision positioning request (Namf_Location_ProvidePositioningInfo Request) sent by the GMLC.

This application provides a communication method to improve security of the positioning service for the UE. In the method, the message related to the location service may be sent through a user plane connection (for example, may be a channel or a tunnel), and a core network public network does not need to sense content of the message transmitted in a user plane tunnel. Therefore, exposure of the message related to the location service to the public network core network element is prevented, so that security of a location-based service for the UE is improved, and a transmission latency can be reduced, thereby improving positioning precision.

The method may be implemented by at least one of an access management network element, a first core network element, a second core network element, and an access network device. The access management network element may include an access and mobility management function network element (for example, an AMF) deployed in a public network or a network element configured to implement a function of an access and mobility management function network element. The first core network element may include a session management network element. The session management network element is, for example, a session management function network element (for example, an SMF) or a network element configured to implement a function of a session management function network element. Alternatively, the first core network element may include a location management network element, for example, a location management function network element (for example, an LMF). The second core network element may include a location management network element. The location management network element is, for example, a location management function network element (for example, an LMF) or a network element configured to implement a function of a location management function network element.

Optionally, the method may alternatively be implemented by a third core network element. Optionally, the third core network element may include a user plane network element, for example, include a user plane function network element (for example, a UPF) or a network element configured to implement a function of a user plane function network element.

Figure 4:
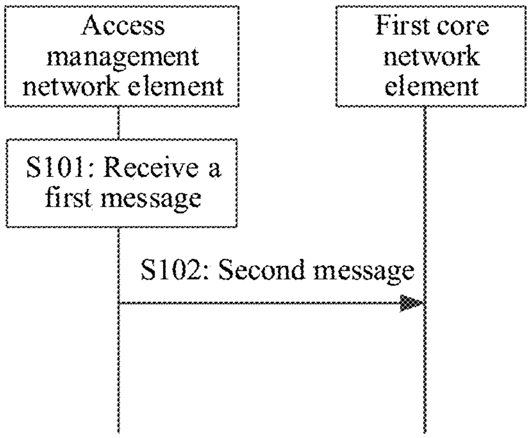
FIG. 4 is a schematic flowchart of a communication method according to an embodiment of this application.

As shown in FIG. 4, a communication method provided in an embodiment of this application may include the following steps.

S101: An access management network element receives a first message.

The first message includes a positioning request (which may be referred to as a location request) of a terminal device. The positioning request of the terminal device may include an MO-LR message.

Alternatively, the first message includes a location information request corresponding to a terminal device. It should be noted that "the first message includes a location information request corresponding to a terminal device" may be explained as follows: The first message is for requesting location information of the terminal device. In other words, the location information request is for requesting the location information of the terminal device.

The location information request corresponding to the terminal device may include an MT-LR message or a location positioning information request, and the location positioning information request is, for example, Namf_Location_ProvidePositioningInfo Request.

In other words, the first message includes a message related to a location service, and the message related to the location service includes the positioning request of the terminal device and/or the location information request corresponding to the terminal device.

In addition, optionally, the first message may be an RRC message, and the location request of the terminal device and/or the location information request corresponding to the terminal device may be carried in a non-access stratum (NAS) PDU in the RRC message.

S102: The access management network element sends a second message to a first core network element.

The second message may be for requesting to establish or update a first user plane connection. Alternatively, the second message is for requesting to select a first user plane connection.

Correspondingly, the first core network element receives the second message. Therefore, the first core network element may establish, update, or select the first user plane connection based on the second message. For example, the first core network element may select the first user plane connection from a plurality of established user plane connections.

The first user plane connection is used to transmit positioning information of the terminal device. The first user plane connection may include an LCS session, an enhanced LCS (eLCS) session (eLCS session), a positioning session, a location session, a PDU session, or the like.

Optionally, the first user plane connection may be a general packet radio service (GPRS) tunneling protocol (GPRS tunneling protocol, GTP)-user plane (GTP-user plane, GTP-U) connection or an IP connection.

"The positioning information (Positioning Message) of the terminal device" may be replaced with "location information (Location message/Location information)", for example, may be long term evolution positioning protocol information (Long Term Evolution Positioning Protocol message, LPP message), new radio positioning protocol A information (NR Positioning Protocol A, NRPP message), new radio positioning information (New Radio Positioning message, NRP message), new radio positioning protocol information (New Radio Positioning Protocol message, NRPP message), new radio advance positioning information (New Radio Advance Positioning Protocol message, NRAPP message), an LPP protocol data unit PDU (LPP PDU), a positioning protocol PDU (PP PDU), a new radio positioning protocol PDU (NPP PDU), or a new radio advance positioning protocol PDU (NRAPP PDU). Specifically, the positioning information of the terminal device, for example, the LPP information, may include at least one of capability request (request capabilities) information, assistance data request (request assistance data) information, location information request (request location information) information, capability provision (provide capabilities) information, assistance data provision (provide assistance data) information, or location information provision (provide location information) information.

Further, the positioning information of the terminal device may further include positioning data. The positioning data may include data obtained by measuring and/or calculating a location of the terminal device by the terminal device or an access network device.

In S102, the second message may include a location service identifier.

For example, the location service identifier may indicate that a service type is a location service. In addition, the location service identifier can also identify the current location service. In other words, the location service identifier may indicate that information corresponding to the location service identifier (for example, sent together with the location service identifier) corresponds to the first message or the terminal device. For example, when the location service identifier is carried in different signaling, it may indicate that positioning information and/or user plane connection information carried in the signaling are/is related to a same terminal device.

Optionally, the location service identifier may include at least one of an LCS correlation identifier (LCS correlation ID), an LCS session identifier (LCS session ID), an eLCS session identifier (eLCS session ID), an eLCS correlation identifier (eLCS correlation ID), an LCS service identifier (LCS service ID), an eLCS service identifier (eLCS service ID), an NRPPa transaction identifier (NRPPa transaction ID), a positioning identifier (positioning ID), a location identifier (location ID), or the like. The location service identifier may alternatively be allocated by the access management network element or a location management network element.

Based on this procedure shown in FIG. 4, after receiving the first message, the access management network element may send the second message to the first core network element, where the second message is used to establish, update, or select the first user plane connection. Correspondingly, the first core network element may establish or update the first user plane connection based on the second message, or select the first user plane connection based on the first message, to transmit, through the first user plane connection, the message related to the location service. In other words, transmission of the message related to the location service through the first user plane connection is supported in the method, preventing exposure of the related message to a public network core network, so that security of the location service is improved.

Optionally, in S102, the second message may further include at least one of an identifier (ID) of the terminal device, a session management (SM) context identifier (SM context ID), a routing identifier (routing ID), an address of the access network device, and first information. The first information indicates the location service.

The following describes information that may be further included in the second message.

An example in which the terminal device is a UE is used. In this application, an identifier of the UE may include a globally unique temporary UE identity (GUTI/5G-GUTI) and/or an NG application protocol (NGAP) identifier (NGAP UE ID) of the UE. The NGAP UE ID may include a RAN NGAP UE ID allocated by the access network device (for example, a RAN NGAP UE ID allocated by a RAN to the UE after the first message is received) and/or an AMF NGAP UE ID allocated by a public network AMF.

The session management context identifier (SM context ID) may identify, for example, a PDU session used to transmit the positioning information.

The routing identifier may include an identifier of the first core network element. An example in which the first core network element is an LMF is used. The identifier of the first core network element is, for example, an identifier of a campus network element, and may be, for example, an identifier of the LMF, or an identifier of the LMF collocated with another campus device. In this application, the identifier of the network element may be a fully qualified domain name (FQDN), an IP address, a network instance identifier (network instance ID), a network element name, a device name, a uniform resource identifier (URI), a uniform resource locator (URL), or the like.

The address of the access network device may be an IP address of the access network device.

The first information may be indication information of the location service. That the first information indicates the location service may alternatively be replaced as follows: The first information indicates a position service, the first information indicates a location-based service, the first information indicates a positioning service, the first information indicates a to business (to B) service, or the like. The first information may be, for example, one or more information elements (IEs); or may be a parameter, for example, may be a data network name (DNN), network slice selection assistance information (NSSAI), a session identifier (for example, a PDU session identifier (PDU session ID)), or a location session identifier (LCS session ID/Location session ID/Positioning session ID).

Based on content that may be carried in the second message, the first core network element can establish, update, or select the first user plane connection more properly and/or efficiently. For example, the first core network element may establish, update, or select a user plane connection of the access network device based on the address of the access network device, so that the user plane connection as the first user plane connection is used to transmit the positioning information. For another example, if the second message includes a routing identifier, for example, includes a routing identifier selected by the access management network element, the first core network element may establish, based on the routing identifier, a first user plane connection between the access network device and the network element to which the routing identifier belongs, thereby improving session establishment efficiency. For another example, if the second message includes the first information, the first core network element may select, based on the first information, a user plane connection that supports the location service as the first user plane connection (for example, the user plane connection is established between the access network device and a user plane function network element (for example, a UPF), and therefore, supports sending the positioning information to the user plane function network element).

In a possible implementation of this application, the access management network element may further receive a reply message (or a feedback message or a response message) of the second message from the first core network element. The reply message may include second information, and the second information may include the location service identifier. Alternatively, the second information may include the location service identifier, and include at least one of the identifier of the terminal device, or core network user plane connection information of the first user plane connection.

For the identifier of the terminal device, refer to descriptions in this application. For example, the identifier of the terminal device may be a generic public subscription identifier (GPSI), a subscription permanent identifier (SUPI), the NGAP UE ID of the UE, or the like.

In this application, the core network user plane connection information of the first user plane connection may be used by the access network device to send the positioning information through the first user plane connection, or may be used to send information (including but not limited to the positioning information) to a core network side tunnel endpoint network element of the first user plane connection (the first user plane connection is a user plane connection between the access network device and the tunnel endpoint network element, the access network device may be referred to as an access network side tunnel endpoint network element, and the core network side tunnel endpoint network element is, for example, a user plane network element (for example, the UPF) or the location management network element (for example, the LMF)). The core network user plane connection information of the first user plane connection may include at least one of an identifier of the tunnel endpoint network element, address information, or core network tunnel information. The core network tunnel information is, for example, core network tunnel information (CN tunnel Info) allocated by an SMF or the UPF, or LMF tunnel information (LMF tunnel Info) or tunnel information (tunnel info) allocated by the LMF. For the core network tunnel information, a tunnel endpoint may be the UPF. For the LMF, the tunnel endpoint may be the LMF. The core network tunnel information may include a tunnel endpoint identifier (TEID) and address information of the tunnel endpoint network element, for example, address information IP address of the tunnel endpoint network element.

It should be understood that, for ease of description subsequently, the core network side tunnel endpoint network element of the first user plane connection may be referred to as a third core network element.

If the first user plane connection is a GTP-U connection, the core network user plane connection information of the first user plane connection may include the core network tunnel information. If the first user plane connection is an IP connection, the core network user plane connection information of the first user plane connection may include an IP address of the third core network device (for example, the UPF or the LMF).

The access management network element may further send the second information to the access network device.

Optionally, the access management network element may further receive third information from the access network device, where the third information includes the location service identifier or includes the location service identifier and at least one of the following information:

the identifier of the terminal device or access network user plane connection information of the first user plane connection.

In this application, the access network user plane connection information of the first user plane connection (including but not limited to the positioning information) may be used to send information to the access network device. Optionally, the access network user plane connection information of the first user plane connection may include an identifier of the access network device, address information, or access network tunnel information (RAN/AN tunnel info). The access network tunnel information may include the TEID allocated by the access network device and the address information of the access network device. The address information of the access network device is, for example, an IP address.

If the first user plane connection is the GTP-U connection, the access network user plane connection information of the first user plane connection may include the access network tunnel information. If the first user plane connection is the IP connection, the access network user plane connection information of the first user plane connection may include the IP address of the access network device.

In an example, after receiving the access network user plane connection information of the first user plane connection, the access management network element may send the access network user plane connection information of the first user plane connection to the first core network element, so that the core network side endpoint network element of the first user plane connection may send the positioning information to the access network device based on the access network user plane connection information.

Optionally, the access management network element may include the access network user plane connection information in a message (for example, the second message) used to modify (or update) the first user plane connection.

Therefore, in this application, the core network user plane connection information and the access network user plane connection information of the first user plane connection may be exchanged between the access network device and the core network side endpoint network element of the first user plane connection by using the access management network element, to transmit the positioning information between the access network device and the core network side endpoint network element through the first user plane connection.

In embodiments of this application, the access management network element may be further configured to send a third message to the second core network element, where the third message is for requesting positioning information of the terminal device, the third message includes second information, and the second information includes the location service identifier, or includes at least one of the location service identifier, the identifier of the terminal device, and the core network user plane connection information of the first user plane connection. The second core network element may be the location management network element, for example, the LMF.

The third message may be used to trigger the location management network element to send positioning information to the access network device, and the positioning information herein is, for example, capability request information, assistance data request information, or location information request information. The second core network element may send the positioning information of the terminal device to the access network device based on the third message through the first user plane connection.

It should be understood that the second core network element may be different from the third core network element. If the two are different, the second core network element may send the third message or the positioning information of the terminal device to the third core network element. Therefore, the third core network element sends the positioning information of the terminal device to the access network device through the first user plane connection. Therefore, the third message may carry information about the third core network element, for example, an identifier or address information. For example, in the third message, the core network user plane connection information of the first user plane connection may include the identifier or the address information of the third core network element. For example, the second core network element is the LMF, and the third core network element is the UPF.

The second core network element may alternatively be the same as the third core network element, for example, both are the LMFs. In this case, the second core network element or the third core network element may send the positioning information of the terminal device to the access network device through the first user plane connection.

In a possible implementation of S102, the first core network element may include a session management network element, for example, an SMF. In this case, the first user plane connection may be a user plane connection between the access network device and a user plane network element, or the third core network element includes a user plane network element. The user plane network element is, for example, the UPF.

The following uses an example in which the third core network element is the UPF for description.

In this implementation, in a process of establishing or updating the first user plane connection, the first core network element may be further configured to select, for the first user plane connection, a user plane network element, for example, the UPF. Optionally, the UPF may be located in a campus. For example, the UPF is located in a campus in which the access network device is located, or is located in a campus adjacent to the access network device.

In this implementation, the first user plane connection may be the GTP-U connection.

For example, if the first core network element is the SMF, the SMF may send a fourth message to the UPF based on the received second message. The fourth message may be used to establish or update the first user plane connection, so that the first user plane connection supports transmission of location data of the terminal device. The fourth message may include the location service identifier. The fourth message may include a PFCP session establishment/modification request or an N4 session establishment/modification request.

Optionally, the core network tunnel information of the first user plane connection may be allocated by the SMF or the UPF. If the core network tunnel information of the first user plane connection is allocated by the SMF, the fourth message may further include the core network tunnel information of the first user plane connection. If the core network tunnel information of the first user plane connection is allocated by the UPF, the UPF may send the core network tunnel information of the first user plane connection to the SMF in response to the fourth message.

In addition, optionally, the SMF may further send third information to the UPF, where the third information may include the access network tunnel information of the first user plane connection. Based on this, the UPF may obtain a correspondence among the core network tunnel information, the access network tunnel information, and the positioning information identifier.

In this implementation, the UPF may store a correspondence among the location service identifier, the identifier of the terminal device, the information about the first user plane connection (including at least one of the identifier of the first user plane connection, the access network user plane connection information of the first user plane connection, and the core network user plane connection information of the first user plane connection), and the information about the second core network element.

Alternatively, the UPF may store the location service identifier, the identifier of the terminal device, and the information about the first user plane connection (including a correspondence with at least one of the identifier of the first user plane connection, the access network user plane connection information of the first user plane connection, and the core network user plane connection information of the first user plane connection).

In addition, the SMF may further send third information to the UPF, where the third information may include the identifier of the terminal device and/or the access network user plane connection information of the first user plane connection. The third information may further include the location service identifier. Optionally, the third information may be carried in a PFCP session update request (PFCP session modification request).

In this implementation of S102, the LMF may send a fifth message to the UPF based on the core network user plane connection information of the first user plane connection or address information of the UPF, where the fifth message may include the positioning information of the terminal device. For example, the fifth message may further include at least one of the location service identifier, the identifier of the terminal device, the core network user plane connection information of the first user plane connection, and the access network user plane connection information of the first user plane connection. When receiving the fifth message, the UPF may send the fifth message or the positioning information of the terminal device to the access network device based on the at least one of the identifier of the terminal device, the location service identifier, the access network user plane connection information of the first user plane connection, or the access network user plane connection information of the first user plane connection through the first user plane connection.

In addition, in this implementation of S102, the UPF may further send a seventh message to the second core network element based on the identifier of the terminal device, the location service identifier, the access network user plane connection information of the first user plane connection, the core network user plane connection information of the first user plane connection, and/or an identifier of the second core network element. Optionally, the seventh message may include positioning information. For example, the seventh message may include an NRPPa message. For details, refer to descriptions in this application.

Therefore, when receiving the positioning information through the first user plane connection, the UPF may send, by using the seventh message, the received positioning message to the LMF, namely, the second core network element, so that the LMF performs subsequent processing on the positioning information.

The following describes the communication method in the embodiment shown in FIG. 4 with reference to FIG. 5A and FIG. 5B to FIG. 8A and FIG. 8B. In embodiments shown in FIG. 5A and FIG. 5B to FIG. 8A and FIG. 8B, a first user plane network element is an SMF, and a third user plane network element is a UPF.

Figure 5A:
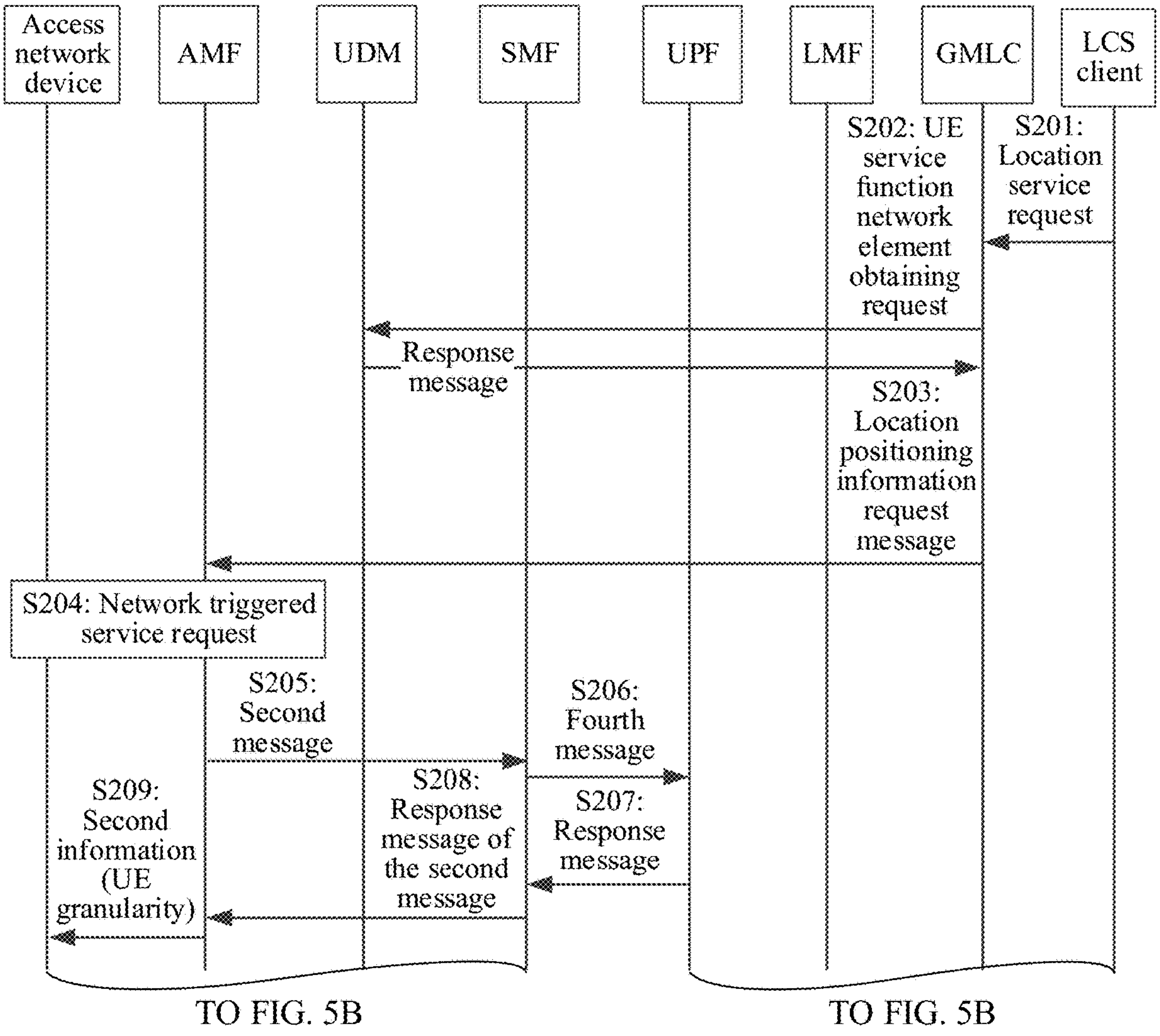
FIG. 5A and FIG. 5B are a schematic flowchart of another communication method according to an embodiment of this application.
Figure 5B:
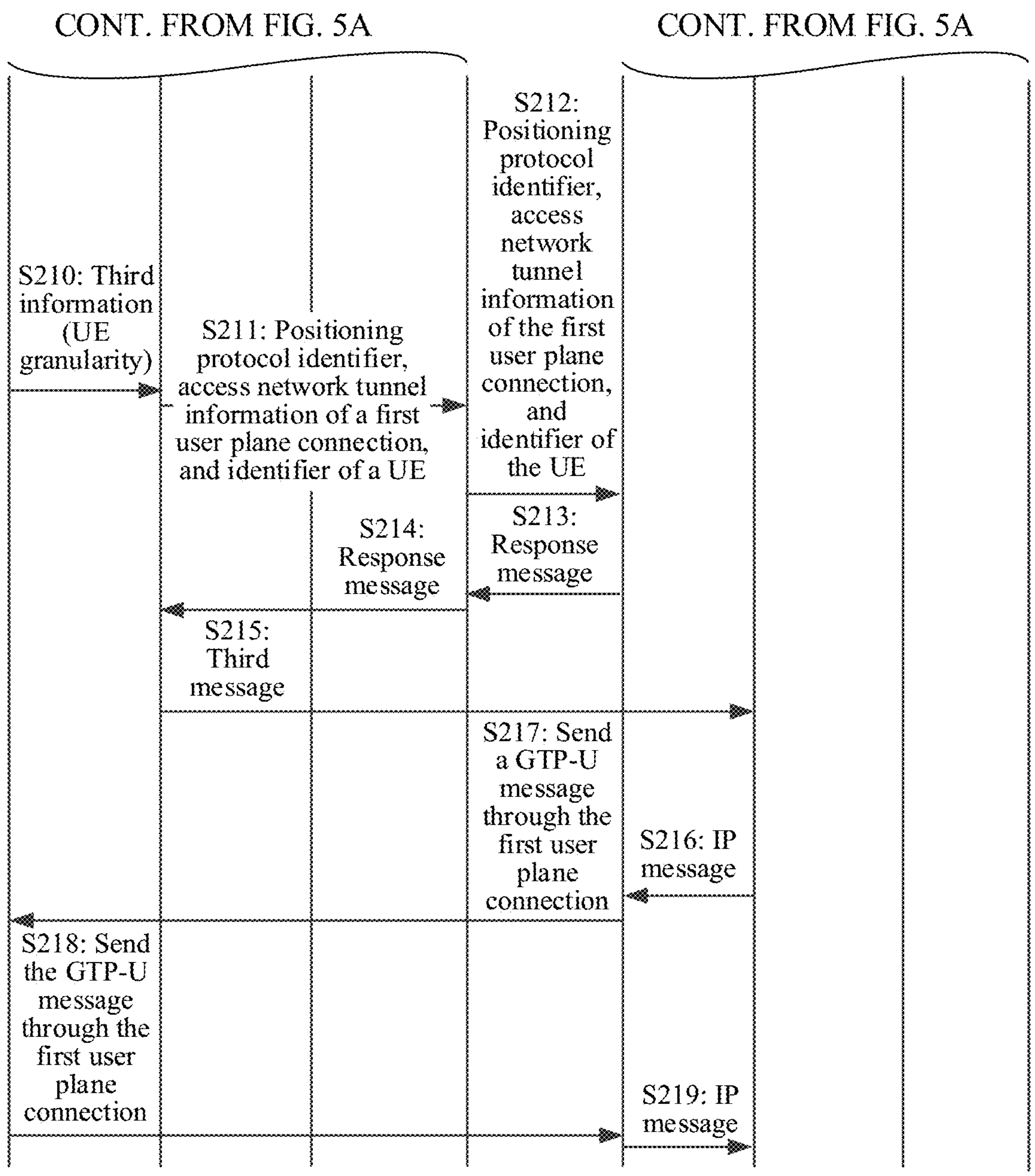
Figure 6A:
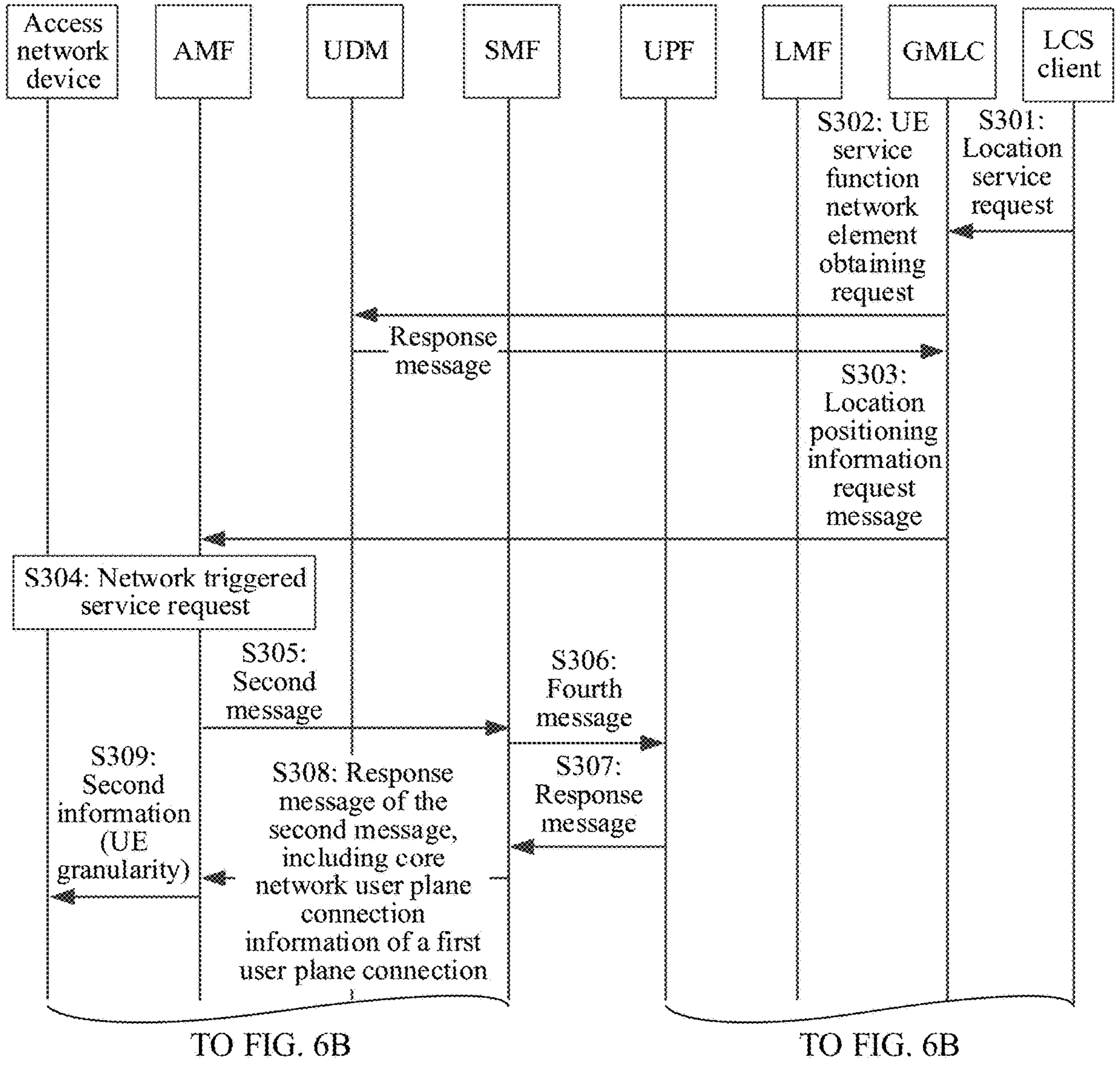
FIG. 6A and FIG. 6B are a schematic flowchart of another communication method according to an embodiment of this application.
Figure 6B:
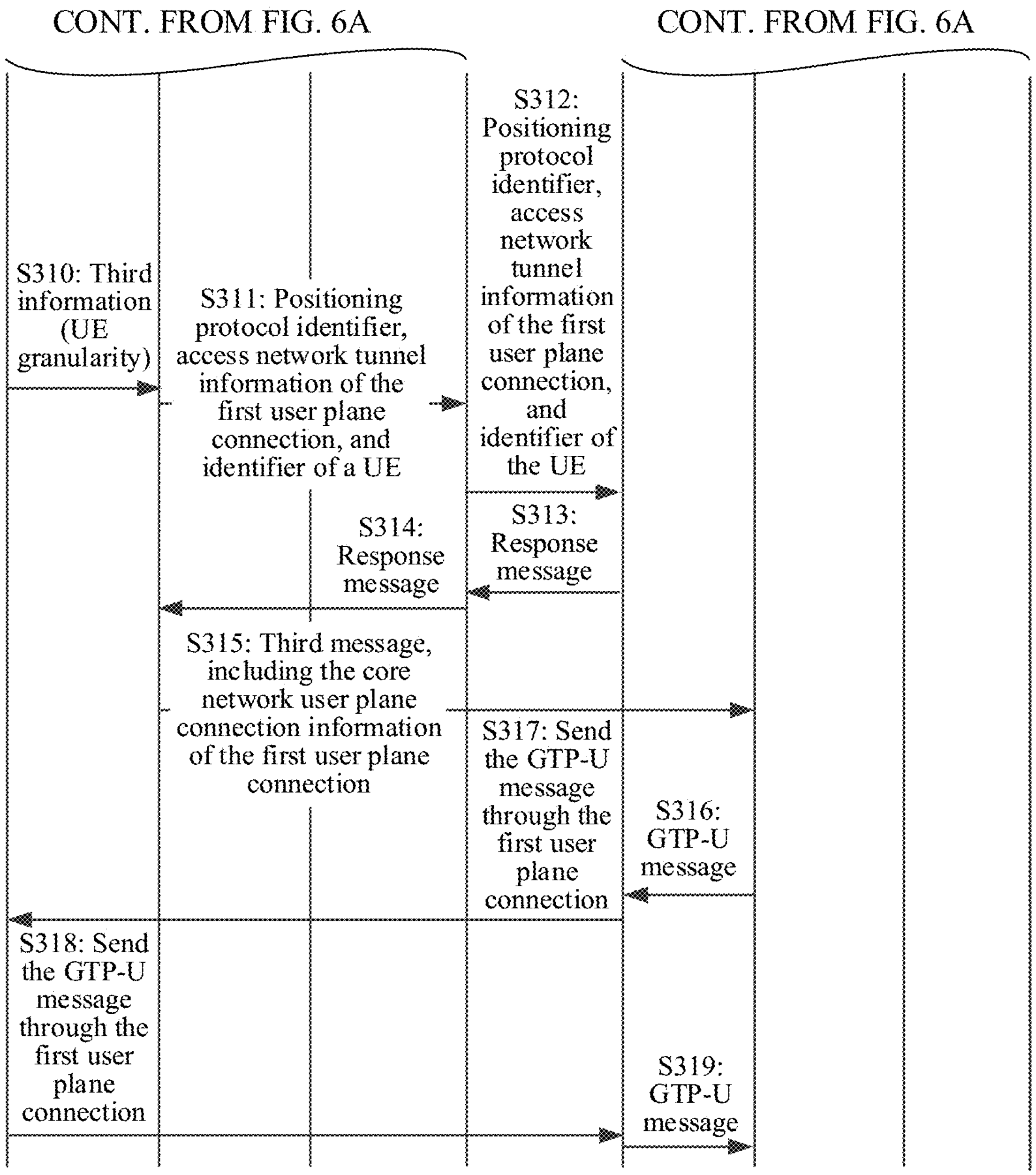
Figure 7A:
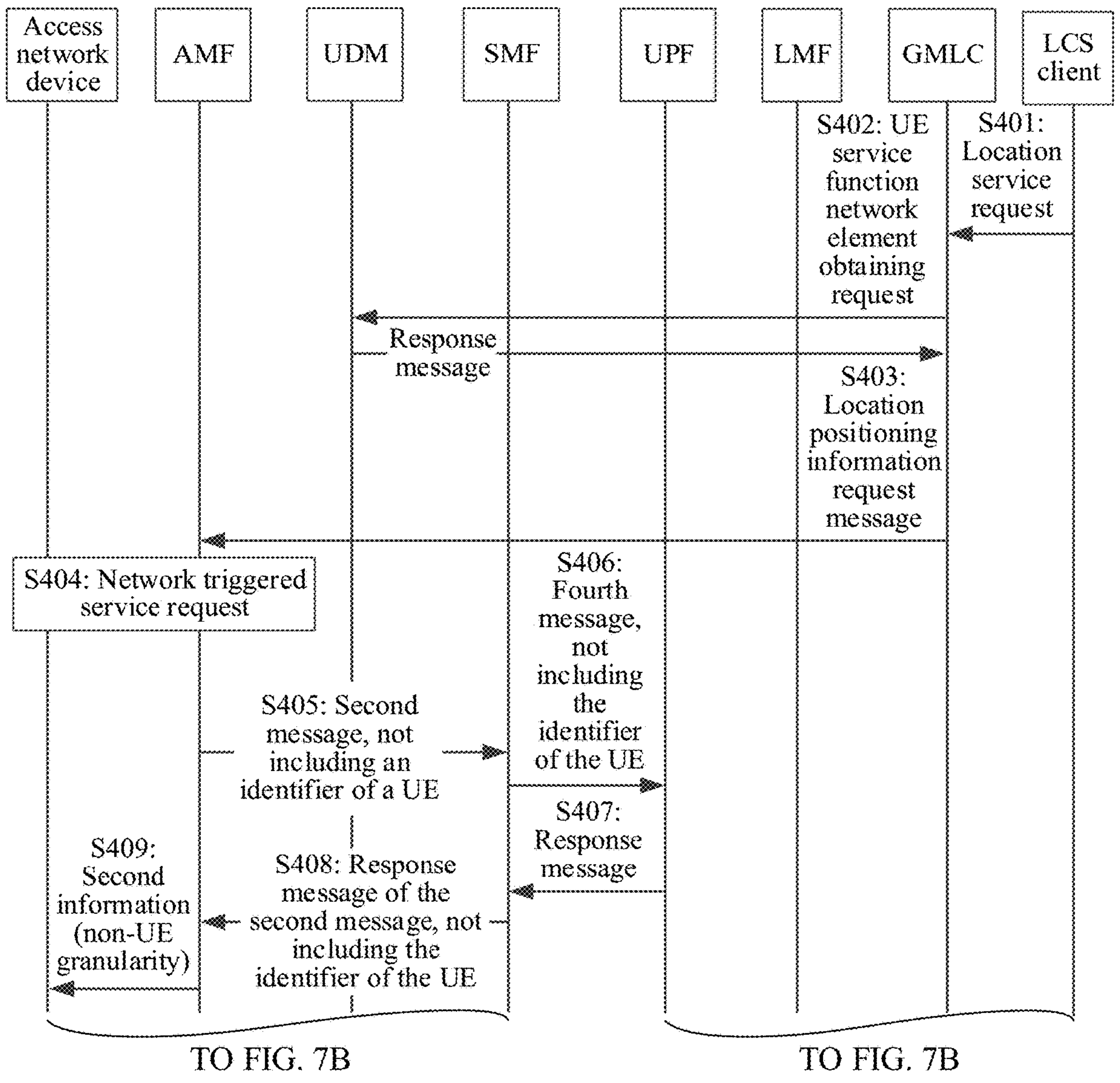
FIG. 7A and FIG. 7B are a schematic flowchart of another communication method according to an embodiment of this application.
Figure 7B:
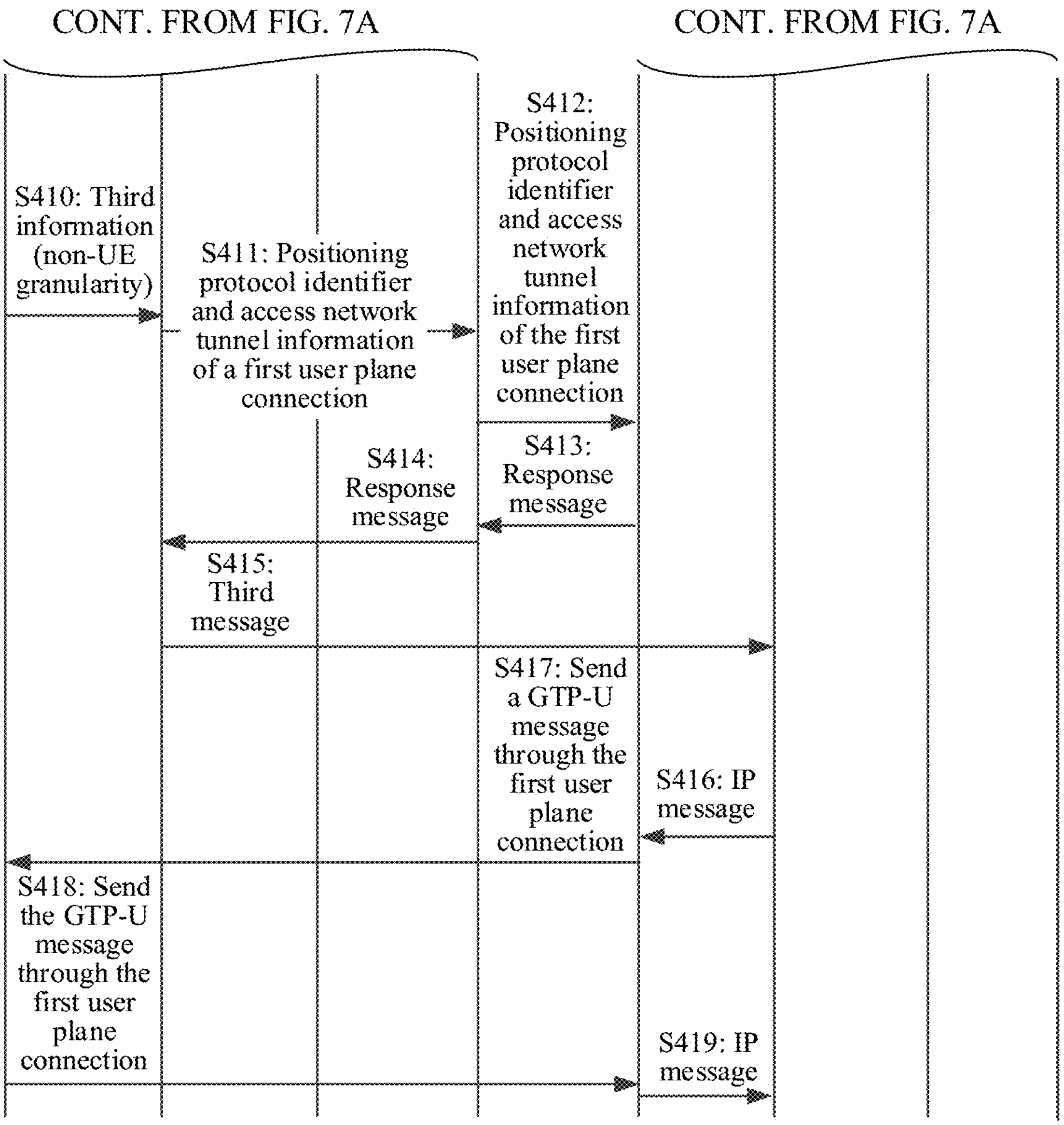
Figure 8A:
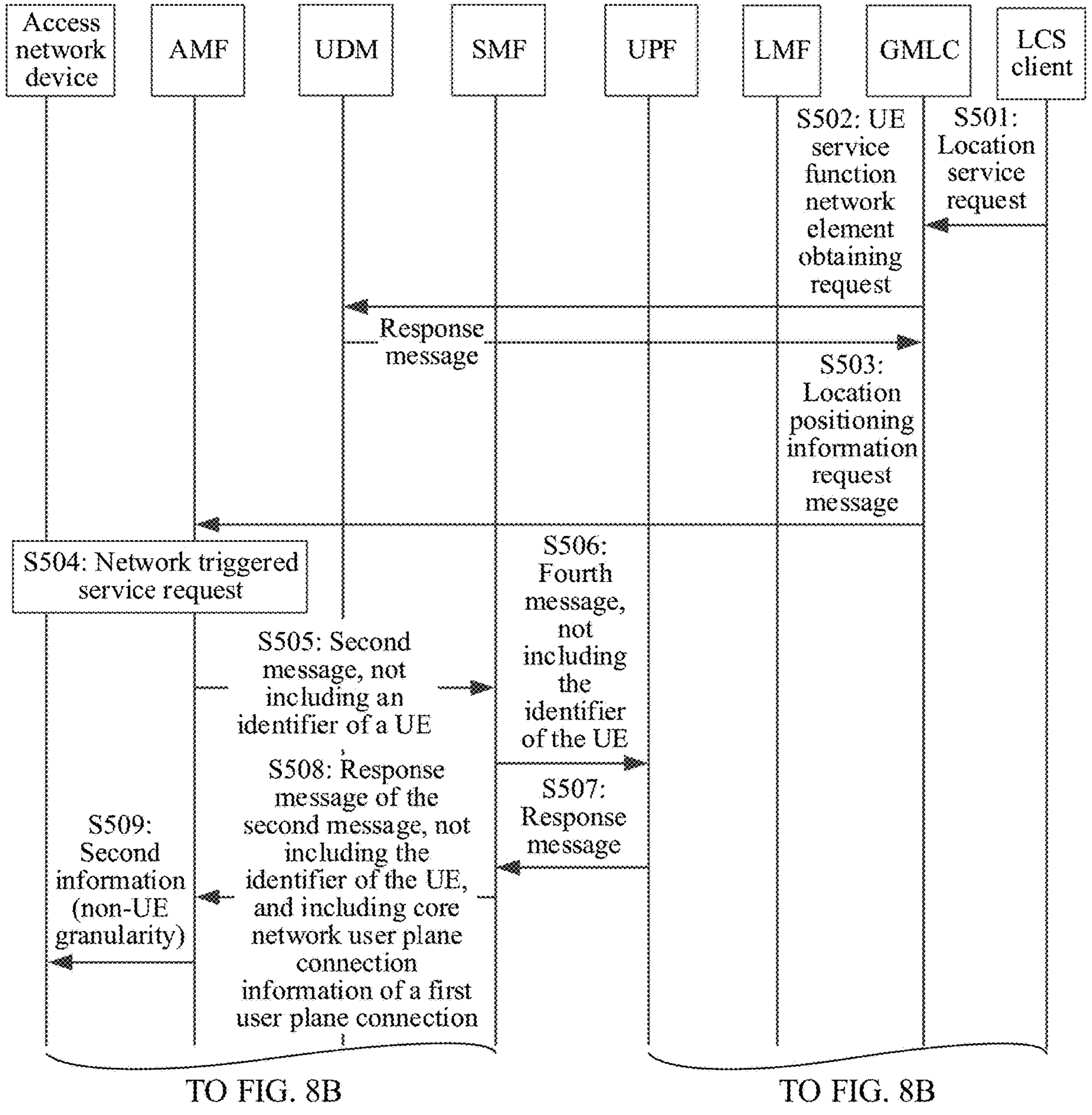
FIG. 8A and FIG. 8B are a schematic flowchart of another communication method according to an embodiment of this application.
Figure 8B:
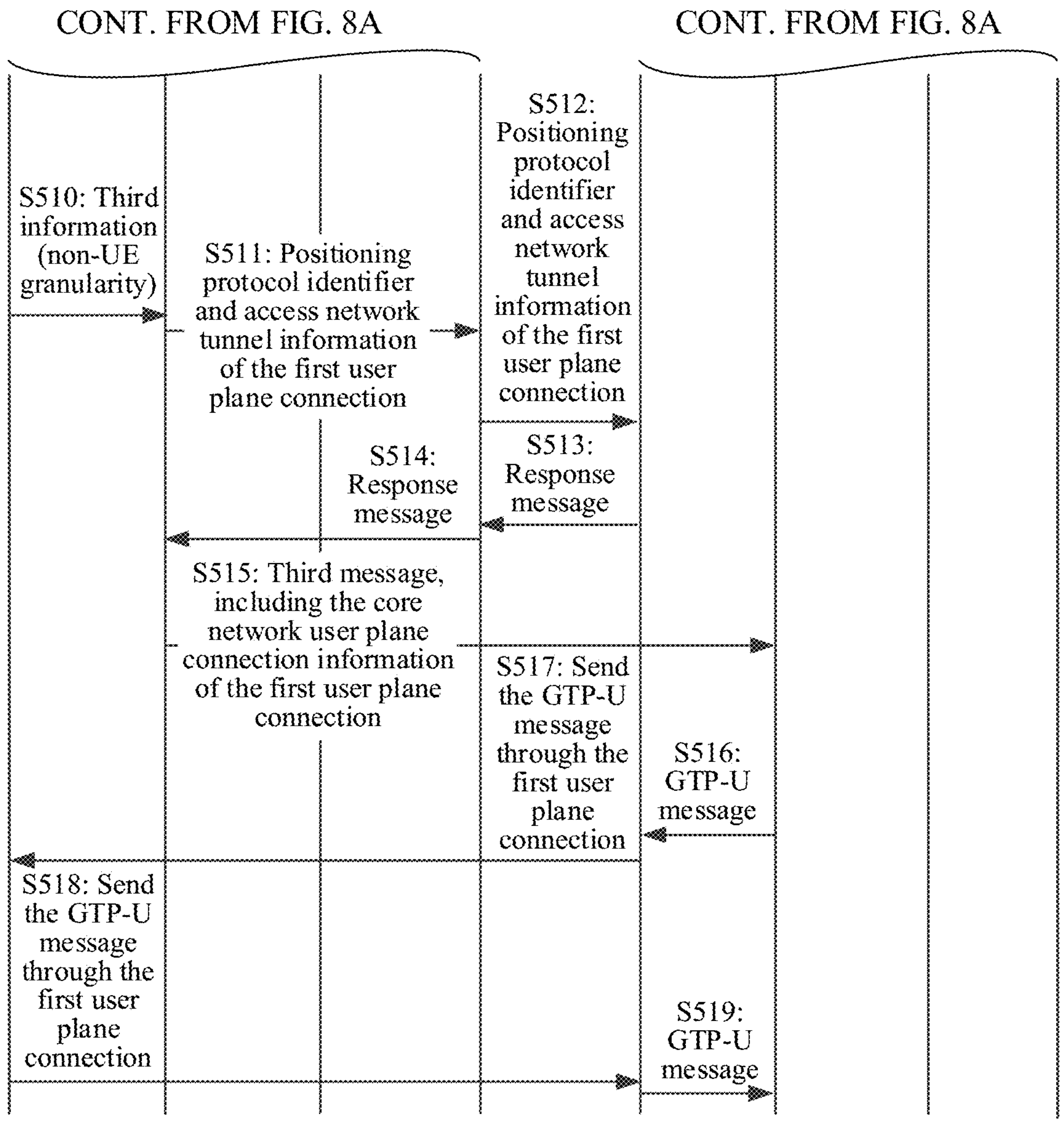

It should be understood that S101 in the procedure shown in FIG. 4 may correspond to S203 in a procedure shown in FIG. 5A and FIG. 5B, S303 in a procedure shown in FIG. 6A and FIG. 6B, S403 in a procedure shown in FIG. 7A and FIG. 7B, or S503 in a procedure shown in FIG. 8A and FIG. 8B.

In addition, S102 in the procedure shown in FIG. 4 may correspond to S205 in the procedure shown in FIG. 5A and FIG. 5B, 305 in the procedure shown in FIG. 6A and FIG. 6B, S405 in the procedure shown in FIG. 7A and FIG. 7B, or S505 in the procedure shown in FIG. 8A and FIG. 8B. It can be learned that for the procedures shown in FIG. 5A and FIG. 5B to FIG. 8A and FIG. 8B, a first core network element includes the SMF, and a second core network element is an LMF.

In addition, for the procedures shown in FIG. 5A and FIG. 5B to FIG. 8A and FIG. 8B, the communication methods include actions performed by the third core network element. In FIG. 5A and FIG. 5B to FIG. 8A and FIG. 8B, an example in which the third core network element is the UPF is used for description. For example, the third core network element performs the foregoing sending.

It should be understood that, in the foregoing embodiments, same described steps may be mutually referenced, and same technical terms and concepts may also be mutually referenced.

As shown in FIG. 5A and FIG. 5B, a communication method provided in an embodiment of this application may include the following steps.

S201: An LCS client sends a location service request (LCS service request) to a GMLC.

The location service request may include an identifier of a UE that needs to be positioned, required quality of service (required QoS) information of a location-based service, supported geographic area description (GAD) information, and the like. The required quality of service information of the location-based service may include precision (for example, centimeter, decimeter, or meter) indication information of a location measurement result, or include response duration indication information of a location measurement result (for example, indicating whether a response is needed immediately, or indicating that a response is made after a period of time). The supported geographic area description information may indicate, for example, global positioning system (GPS) position coordinates, for example, GPS coordinates represented by using longitude and latitude.

S202: The GMLC sends a UE service function network element obtaining request (Nudm_UECM_Get Request) to a UDM, to obtain an identifier of a function network element that serves the UE. For example, the UE service function network element obtaining request may carry an identifier of the UE and a type of the required function network element, for example, carry a network element or network function type information, to indicate that the type of the function network element is an AMF.

Therefore, the GMLC may obtain, from the UDM, information about the AMF that provides a service for the UE.

S203: The GMLC sends, to the AMF, a location positioning information request including information such as the identifier of the UE and an LCS client type.

Correspondingly, the AMF receives the location positioning information request.

It should be understood that in this application, the first message in S101 may include the location positioning information request.

S204: If finding that the UE is in a connection management (CM)-idle (CM-IDLE) state, the AMF triggers a network triggered service request, to page a target UE back to a CM-connected state. If finding that the UE is in the CM-connected state, the AMF may skip S204, and perform S205.

S205: The AMF sends a second message to an SMF, where the second message may be for requesting to establish a first user plane connection, or the second message may be for selecting a first user plane connection. The first user plane connection is used to transmit positioning information of the UE.

For example, the second message may include a location service identifier, an identifier (or a routing identifier) of an LMF, first information, and the identifier of the UE. The location service identifier may include at least one of an LCS correlation ID, an LCS session ID, an eLCS session ID, an eLCS correlation ID, an LCS service ID, a positioning session ID, a location ID, an eLCS service ID, an NRPPa transaction ID, or the like. The location service identifier may alternatively be allocated by the AMF or the LMF. The identifier of the UE may include an SUPI or a GPSI. The first information may be a PDU session identifier (PDU session ID) used to transmit the positioning information of the UE, or may be a PDU session SM context ID used to transmit the positioning information of the UE, the first information may be campus network information (for example, a DNN) and/or slice information (for example, NSSAI or S-NSSAI) corresponding to a PDU session used to transmit the positioning information of the UE, or the first information is an information element specially configured to select the first user plane connection used to transmit the positioning information of the UE.

It should be understood that in this application, the second message in S102 may include the second message in S205.

S206: The SMF sends a fourth message to a UPF, where the fourth message is used to establish or modify the first user plane connection. The fourth message may include the location service identifier, the identifier of the LMF, and the identifier of the UE.

Optionally, the SMF may further select the UPF, and request the UPF to establish the first user plane connection.

In S206, the fourth message may include a PFCP session establishment/modification request, or the fourth message may include an N4 session establishment/modification request.

Optionally, if core network user plane connection information of the first user plane connection is allocated by the SMF, the fourth message further includes the core network user plane connection information allocated by the SMF. Correspondingly, after receiving the fourth message, the UPF may obtain and/or store a correspondence among the core network user plane connection information of the first user plane connection, the location service identifier, the identifier of the LMF, and the identifier of the UE.

S207: The UPF sends, to the SMF, a response message corresponding to the fourth message. The response message is, for example, a PFCP session establishment/modification response.

Optionally, if the core network user plane connection information of the first user plane connection is allocated by the UPF, the response message may include the core network user plane connection information allocated by the UPF.

In addition, after allocating the core network user plane connection information, the UPF may store a correspondence among the core network user plane connection information of the first user plane connection, the location service identifier, the identifier of the LMF, and the identifier of the UE.

S208: The SMF sends a response message of the second message to the AMF.

The response message may include N2 session management information (N2 SM Info). The N2 session management information may include the core network user plane connection information of the first user plane connection. For example, the response message may include the location service identifier and the identifier of the UE. Optionally, the response message may further include an identifier and/or address information of the UPF, and the address information is, for example, an IP address of the UPF.

S209: The AMF sends second information to an access network device, where the second information includes the location service identifier and core network user plane connection information of the first user plane connection.

In S209, the AMF sends the second information to the access network device by using a UE granularity or UE associated N2 message. For example, the AMF sends, through an NGAP connection of the UE, the UE granularity N2 message that includes the location service identifier. The UE granularity N2 message may include N2 SM information (N2 SM info), and the N2 SM information may include the core network user plane connection information of the first user plane connection. The access network device receives the N2 message, and stores the location service identifier and the core network user plane connection information of the first user plane connection in a context of the UE. For example, the context of the UE may be an NGAP UE context.

Therefore, the access network device may obtain (and/or store) a correspondence among the location service identifier, the core network user plane connection information of the first user plane connection, and the identifier of the UE. In addition, the access network device may further allocate access network tunnel information of the first user plane connection, to obtain (and/or store) a correspondence among the location service identifier, the access network tunnel information of the first user plane connection, the core network user plane connection information of the first user plane connection, and the identifier of the UE.

S210: The access network device sends third information to the AMF. The third information includes the location service identifier and the access network tunnel information of the first user plane connection, for example, AN tunnel Info.

In S210, the access network device may send, to the AMF, the UE granularity N2 message that includes the location service identifier. The N2 message may further carry the N2 SM information, and the N2 SM message may include the AN tunnel Info allocated by the access network device.

S211: The AMF sends a positioning protocol identifier, the access network tunnel information of the first user plane connection, and the identifier of the UE to the SMF.

S211 may alternatively be replaced as follows: The AMF sends the third information to the SMF.

Optionally, the AMF may send, to the SMF, a message that is used to update the first user plane connection and that carries the location service identifier, the access network tunnel information of the first user plane connection, and the identifier of the UE.

S212: The SMF sends the positioning protocol identifier, the access network tunnel information of the first user plane connection, and the identifier of the UE to the UPF.

Optionally, the SMF may send, to the UPF, a PFCP session modification/modification request that carries the positioning protocol identifier, the access network tunnel information of the first user plane connection, and the identifier of the UE. The PFCP session modification/modification request may be used by the UPF to modify information about the first user plane connection.

Based on S206, S207, and S212, the UPF may obtain (or store) a correspondence among the core network user plane connection information of the first user plane connection, the access network tunnel information of the first user plane connection, the location service identifier, the identifier of the LMF, and the identifier of the UE.

S213: The UPF sends, to the SMF, a response message corresponding to S212. For example, the response message may include a PFCP session modification response.

S214: The SMF sends, to the AMF, the response message corresponding to S211.

S215: The AMF sends, to the LMF, a third message that includes the location service identifier, the identifier of the UE (for example, the SUPI or the GPSI), and the identifier or the address information of the UPF, where the address information is, for example, the IP address. The IP address of the UPF may be sent by the SMF to the AMF in S208, or the IP address of the UPF may be configured in the AMF in a configuration manner, or the AMF may have obtained the IP address of the UPF.

The third message may include a location measurement request (Nlmf_Location_Determined Location Request).

S216: The LMF sends an IP message to the UPF.

The LMF may send the IP message to the UPF based on the address information of the UPF.

For example, the IP message may include an NRPPa message, an LPP message, an NRP message, an NRAPP message, a PP message, an NRAPP message, or an NPP message. Optionally, the NRPPa message, the LPP message, the NRP message, the NRAPP message, the PP message, the NRAPP message, or the NPP message may include the location service identifier and the identifier of the UE. The location service identifier and the identifier of the UE may be carried in an IP extended header, for example, an optional variable-length option part of the IP extended header. Alternatively, the location service identifier and the identifier of the UE may be carried in an IP payload. The identifier of the UE may include at least one of the SUPI, the GPSI, and an NGAP UE ID.

The NRPPa message may further include the positioning information.

S217: The UPF sends a GTP-U message to the access network device through the first user plane connection.

The GTP-U message may include the NRPPa message, the LPP message, the NRP message, the NRAPP message, the PP message, the NRAPP message, or the NPP message.

For example, the UPF may determine the access network tunnel information of the associated first user plane connection based on the location service identifier and the identifier of the UE that are carried in an IP header extended field or the IP payload of the IP message, and send the NRPPa message, the LPP message, the NRP message, the NRAPP message, the PP message, the NRAPP message, or the NPP message based on the access network tunnel information of the first user plane connection, or send the NRPPa message, the LPP message, the NRP message, the NRAPP message, the PP message, the NRAPP message, or the NPP message to the access network tunnel information of the first user plane connection.

The NRPPa, the LPP message, the NRP message, the NRAPP message, the PP message, the NRAPP message, or the NPP message may be carried in the GTP-U message. An extended header or a payload part of the GTP-U message may further carry the location service identifier and/or the identifier of the UE. The payload part may include the NRPPa, the LPP message, the NRP message, the NRAPP message, the PP message, the NRAPP message, or the NPP message.

S218: The access network device sends the GTP-U message to the UPF through the first user plane connection.

The GTP-U message may include the NRPPa message, the LPP message, the NRP message, the NRAPP message, the PP message, the NRAPP message, or the NPP message.

The access network device may perform location measurement on the UE to obtain a positioning measurement result, and the NRPPa message, the LPP message, the NRP message, the NRAPP message, the PP message, the NRAPP message, or the NPP message may carry the location measurement result of the UE.

In addition, the access network device may determine, based on the identifier of the UE and the location service identifier, the core network user plane connection information of the associated first user plane connection, and send, based on the core network user plane connection information, the NRPPa message, the LPP message, the NRP message, the NRAPP message, the PP message, the NRAPP message, or the NPP message that carries the positioning measurement result, to send the location measurement result of the UE to the UPF through the first user plane connection.

S219: After receiving the location measurement result of the UE, the UPF may determine the identifier of the associated LMF based on the identifier of the UE, the location service identifier, and the access network tunnel information of the first user plane connection, to send the IP message to the LMF.

The IP message may carry the location service identifier and the identifier of the UE. The IP message may further include the NRPPa message, the LPP message, the NRP message, the NRAPP message, the PP message, the NRAPP message, or the NPP message that carries the positioning measurement result. The location service identifier and the identifier of the UE may be carried in the IP extended header, for example, the optional variable-length option part of the IP extended header, or the IP payload. The IP payload, for example, includes the NRPPa message.

Correspondingly, the LMF may receive the IP message, and obtain the NRPPa message, the LPP message, the NRP message, the NRAPP message, the PP message, the NRAPP message, or the NPP message. Optionally, the LMF may obtain the positioning measurement result in the NRPPa message, the LPP message, the NRP message, the NRAPP message, the PP message, the NRAPP message, or the NPP message.

Based on this procedure shown in FIG. 5A and FIG. 5B, the positioning information of the UE is sent through the first user plane connection between the access network device and the UPF. The first user plane connection is a GTP-U connection. The first user plane connection is at a UE granularity. To be specific, positioning information of different UEs may be sent through different first user plane connections. In addition, in the procedure shown in FIG. 5A and FIG. 5B, the positioning information of the UE may be transferred between the UPF and the LMF by using the IP message. The positioning information of the UE may be carried in the NRPPa message or the LPP message. For example, the positioning information may include the positioning information sent by the LMF, and may further include positioning measurement information sent by the access network device.

As shown in FIG. 6A and FIG. 6B, an example in which an access management network element is an AMF and a second core network element is an LMF is still used. When a first user plane network element is an SMF, and a third user plane network element is a UPF, another communication method provided in an embodiment of this application may include the following steps.

S301 to S307 are respectively the same as S201 to S207. For details, refer to again.

S308: The SMF sends a response message of a second message to the AMF. A difference from S208 lies in that, in addition to core network user plane connection information of a first user plane connection in N2 session management information, the response message further carries the core network user plane connection information of the first user plane connection in addition to the N2 session management information. Therefore, the AMF may know the core network user plane connection information. In addition, the response message may further include a location service identifier and an identifier of a UE.

S309 to S314 are respectively the same as S209 to S214. For details, refer to descriptions in the procedure shown in FIG. 5A and FIG. 5B. Details are not described herein again.

S315: The AMF sends, to the LMF, a third message that includes the location service identifier, the identifier of the UE (for example, an SUPI or a GPSI), and the core network user plane connection information of the first user plane connection.

S316: The LMF sends a GTP-U message to the UPF.

For example, the GTP-U message may include an NRPPa message, an LPP message, an NRP message, an NRAPP message, a PP message, an NRAPP message, or an NPP message. Optionally, the NRPPa message, or the LPP message, the NRP message, the NRAPP message, the PP message, the NRAPP message, or the NPP message may include the location service identifier and the identifier of the UE. The location service identifier and the identifier of the UE may be carried in an IP extended header, for example, an extended header of the GTP-U message. Alternatively, the location service identifier and the identifier of the UE may be carried in a payload of the GTP-U message. The identifier of the UE may include at least one of the SUPI, the GPSI, and an NGAP UE ID. The NRPPa message, the LPP message, the NRP message, the NRAPP message, the PP message, or the NRAPP message, or the NPP message may further include positioning information.

The extended header or the payload of the GTP-U message may further carry tunnel information (LMF tunnel info) or tunnel information (tunnel info) allocated by the LMF.

S317: The UPF sends a GTP-U message to the access network device through the first user plane connection.

The GTP-U message may include the NRPPa message, the LPP message, the NRP message, the NRAPP message, the PP message, the NRAPP message, or the NPP message.

For example, the UPF may determine access network tunnel information of the associated first user plane connection based on the location service identifier and the identifier of the UE that are carried in the extended header or the payload of the GTP-U message, and send the NRPPa message, the LPP message, the NRP message, the NRAPP message, the PP message, the NRAPP message, or the NPP message based on the access network tunnel information of the first user plane connection, or send the NRPPa message, the LPP message, the NRP message, the NRAPP message, the PP message, the NRAPP message, or the NPP message to the access network tunnel information of the first user plane connection.

S318 is the same as S218. For details, refer to descriptions in the procedure shown in FIG. 5A and FIG. 5B.

S319: After receiving a location measurement result of the UE, the UPF may determine an identifier of the associated LMF based on the identifier of the UE, the location service identifier, and the access network tunnel information of the first user plane connection, to send a GTP-U message to the LMF.

The UPF may obtain, based on S316, the tunnel information allocated by the LMF, and send the GTP-U message to the LMF based on the tunnel information.

The GTP-U message may carry the location service identifier and the identifier of the UE. The GTP-U message may further include the NRPPa message, the LPP message, the NRP message, the NRAPP message, the PP message, the NRAPP message, or the NPP message that carries a positioning measurement result. The location service identifier and the identifier of the UE may be carried in an extended header of the GTP-U message or a payload of the GTP-U message. The payload of the GTP-U message includes, for example, the NRPPa message, the LPP message, the NRP message, the NRAPP message, the PP message, the NRAPP message, or the NPP message.

Correspondingly, the LMF may receive the GTP-U message, and obtain the positioning measurement result.

It can be learned that a difference between this procedure in FIG. 6A and FIG. 6B and the procedure in FIG. 5A and FIG. 5B lies in that the positioning information of the UE is transferred between the UPF and the LMF by using the GTP-U message. The positioning information of the UE may be carried in the NRPPa message, the LPP message, the NRP message, the NRAPP message, the PP message, the NRAPP message, or the NPP message. For example, the positioning information may include positioning information sent by the LMF, and may further include the positioning measurement result sent by the access network device.

As shown in FIG. 7A and FIG. 7B, when a first user plane network element is an SMF, and a third user plane network element is a UPF, another communication method provided in an embodiment of this application may include the following steps.

S401 to S404 are respectively the same as S201 to S204. For details, refer to descriptions in the procedure shown in FIG. 5A and FIG. 5B. Details are not described herein again.

S405 to S407 are respectively similar to S205 to S207. Therefore, for S405 to S407, refer to descriptions in the procedure shown in FIG. 5A and FIG. 5B. A difference lies only in that in S405, a second message sent by an AMF to the SMF does not include an identifier of a UE; and in S406, a fourth message sent by the SMF to the UPF does not include the identifier of the UE.

Therefore, based on S406 and/or S407, the UPF may obtain and/or store a correspondence among core network user plane connection information of a first user plane connection, a location service identifier, and an identifier of the LMF.

S408 to S414 are respectively similar to S208 to S214. Therefore, for S408 to S414, refer to descriptions in the procedure shown in FIG. 5A and FIG. 5B. A difference lies in:

in S408, a response message that is of a second message and that is sent by the SMF to the AMF does not include the identifier of the UE.

In S409, the AMF sends second information to an access network device by using a non-UE associated N2 message, and the access network device stores the location service identifier and the core network user plane connection information of the first user plane connection in a context related to a location service.

In S410, the access network device may send, to the AMF, a non-UE granularity or non-UE associated N2 message that carries third information.

In S411, the AMF sends a positioning protocol identifier and access network tunnel information of the first user plane connection to the SMF.

In S412, the SMF sends the positioning protocol identifier and the access network tunnel information of the first user plane connection to the UPF.

S415 to S419 are respectively the same as S215 to S219. For details, refer to again.

It can be learned that a difference between this procedure shown in FIG. 7A and FIG. 7B and the procedure shown in FIG. 5A and FIG. 5B lies in that the first user plane connection in the procedure shown in FIG. 7A and FIG. 7B is at a location service granularity or a node granularity (namely, a base station granularity/access network device granularity) rather than a UE granularity. To be specific, positioning information of different UEs and/or positioning information of different LCS services may all be transmitted through a same first user plane connection, thereby saving transmission resources and improving transmission performance. For example, for the UE granularity, for example, for 10 UEs, 10 user plane connections may be needed. For three services of 10 UEs, there may be 30 user plane connections. For the service granularity, for a same service of 10 UEs, only one user plane connection is needed, and for three services of 10 UEs, only three user plane connections are needed. For the node granularity, regardless of whether the 10 UEs under a same base station or access network device correspond to one service or three services, only one user plane connection is needed.

As shown in FIG. 8A and FIG. 8B, when a first user plane network element is an SMF, and a third user plane network element is a UPF, another communication method provided in an embodiment of this application may include the following steps.

S501 to S507 are respectively the same as S401 to S407. To be specific, S501 to S504 are respectively the same as S201 to S204. For details, refer to descriptions in the procedure shown in FIG. 5A and FIG. 5B. Details are not described herein again. S505 to S507 are respectively the same as S404 to S407. For details, refer to descriptions in the procedure shown in FIG. 7A and FIG. 7B.

S508 is similar to S408. Therefore, for S508, refer to descriptions of S408 in the procedure shown in FIG. 7A and FIG. 7B. A difference lies only in that in S508, in addition to core network user plane connection information of a first user plane connection in N2 session management information, a response message that is of a second message and that is sent by the SMF to an AMF carries the core network user plane connection information of the first user plane connection in addition to the N2 session management information.

S509 to S514 are respectively the same as S409 to S414. For details, refer to descriptions in the procedure shown in FIG. 7A and FIG. 7B. Details are not described herein again.

S515 to S519 are respectively the same as S315 to S319. For details, refer to descriptions in the procedure shown in FIG. 6A and FIG. 6B. Details are not described herein again.

It can be learned that a difference between this procedure shown in FIG. 8A and FIG. 8B and the procedure shown in FIG. 5A and FIG. 5B lies in that in the procedure shown in FIG. 8A and FIG. 8B, the positioning information of the UE is transferred between the UPF and the LMF by using a GTP-U message. The positioning information of the UE may be carried in an NRPPa message, an LPP message, an NRP message, an NRAPP message, a PP message, an NRAPP message, or an NPP message. For example, the positioning information may include positioning information sent by the LMF, and may further include a positioning measurement result sent by an access network device. In addition, the first user plane connection in the procedure shown in FIG. 8A and FIG. 8B is at a location service granularity rather than a UE granularity or being UE associated. To be specific, positioning information of different UEs and/or positioning information of different LCS services may all be transmitted through a same first user plane connection, thereby saving transmission resources and improving performance of transmitting the positioning information.

In another possible implementation of S102, the first core network element may include a location management network element, for example, an LMF. In this case, the first user plane connection may be a user plane connection between the access network device and the location management network element, or the first core network element and a second core network element are the same, and are both location management network elements. It should be understood that in this implementation, the first core network element may not need to communicate with a third core network element, that is, the third core network element does not need to participate in the method.

It should be understood that, in this implementation, the first user plane connection may be a GTP-U connection, or may be an IP connection, or may be another new connection manner (for example, a dedicated new protocol stack needs to be defined. For example, a transport layer above IP may be a UDP, a TCP, or an SCTP, and a layer above the transport layer may be a location application layer (for example, a location application (LA)) or a positioning application layer (for example, a positioning application (Positioning Application, PA)) or a location service layer (for example, an LCS (Location Service, LCS))).

If the first user plane connection is the GTP-U connection, a GTP-U message may be transmitted between the access network device and the LMF, and the GTP-U message may include the positioning information. If the first user plane connection is the IP connection, an IP message may be transmitted between the access network device and the LMF, and the IP message may include the positioning information. If the first user plane connection is an LA connection, an LA message may be transmitted between the access network device and the LMF, and the LA message may include the positioning information. If the first user plane is a PA connection, a PA message may be transmitted between the access network device and the LMF, and the PA message may include the positioning information. If the first user plane is an LCS connection, an LCS message may be transmitted between the access network device and the LMF, and the LCS message may include the positioning information.

An example in which a location management network element is an LMF is used below. When the location management network element is used as a first core network element, a communication method provided in an embodiment of this application is described with reference to FIG. 9A and FIG. 9B to FIG. 12A and FIG. 12B. It should be understood that S101 in the procedure shown in FIG. 4 may correspond to S603 in a procedure shown in FIG. 9A and FIG. 9B, S703 in a procedure shown in FIG. 10A and FIG. 10B, S803 in a procedure shown in FIG. 11A and FIG. 11B, or S903 in a procedure shown in FIG. 12A and FIG. 12B.

Figure 9A:
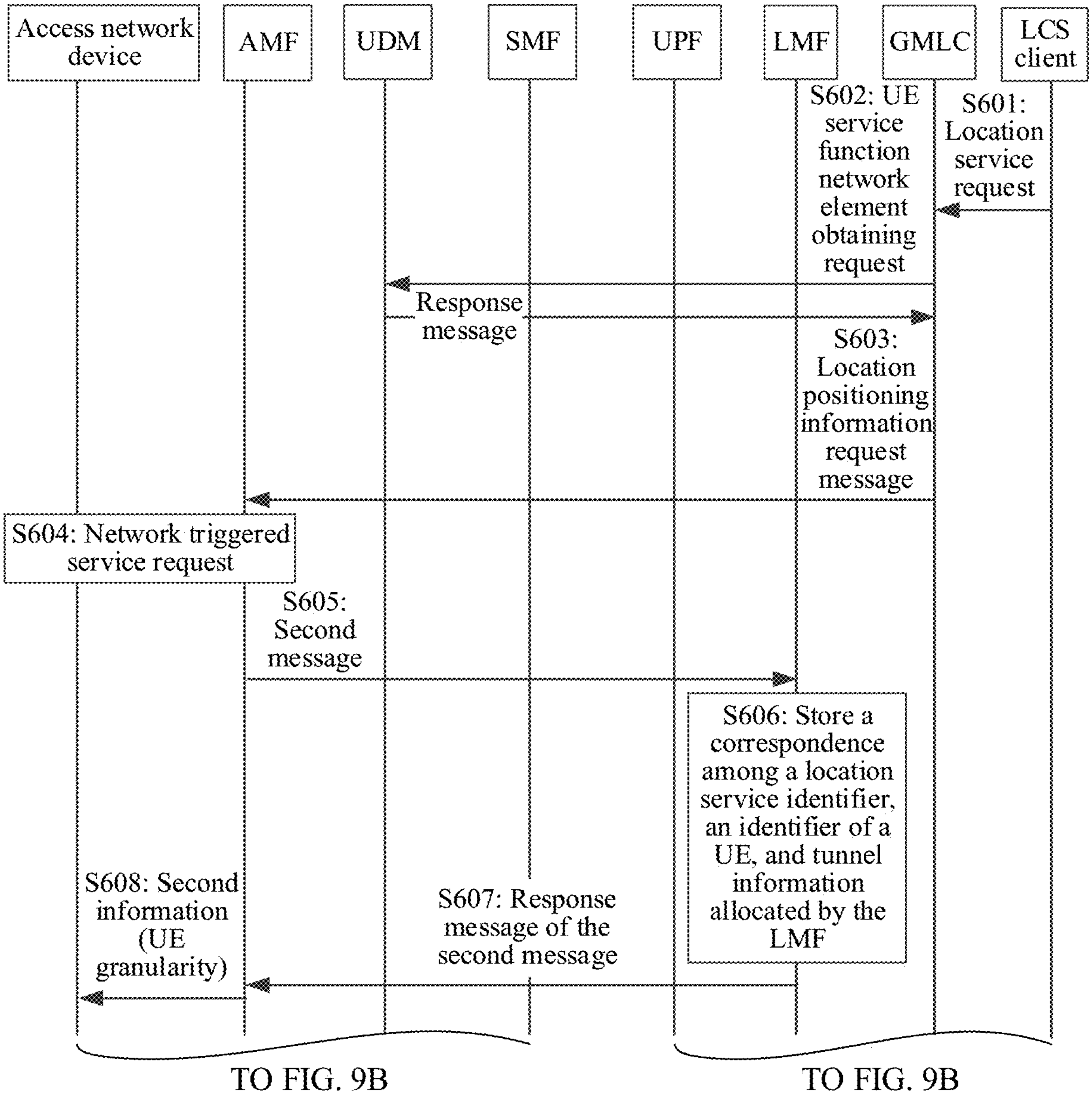
FIG. 9A and FIG. 9B are a schematic flowchart of another communication method according to an embodiment of this application.
Figure 9B:
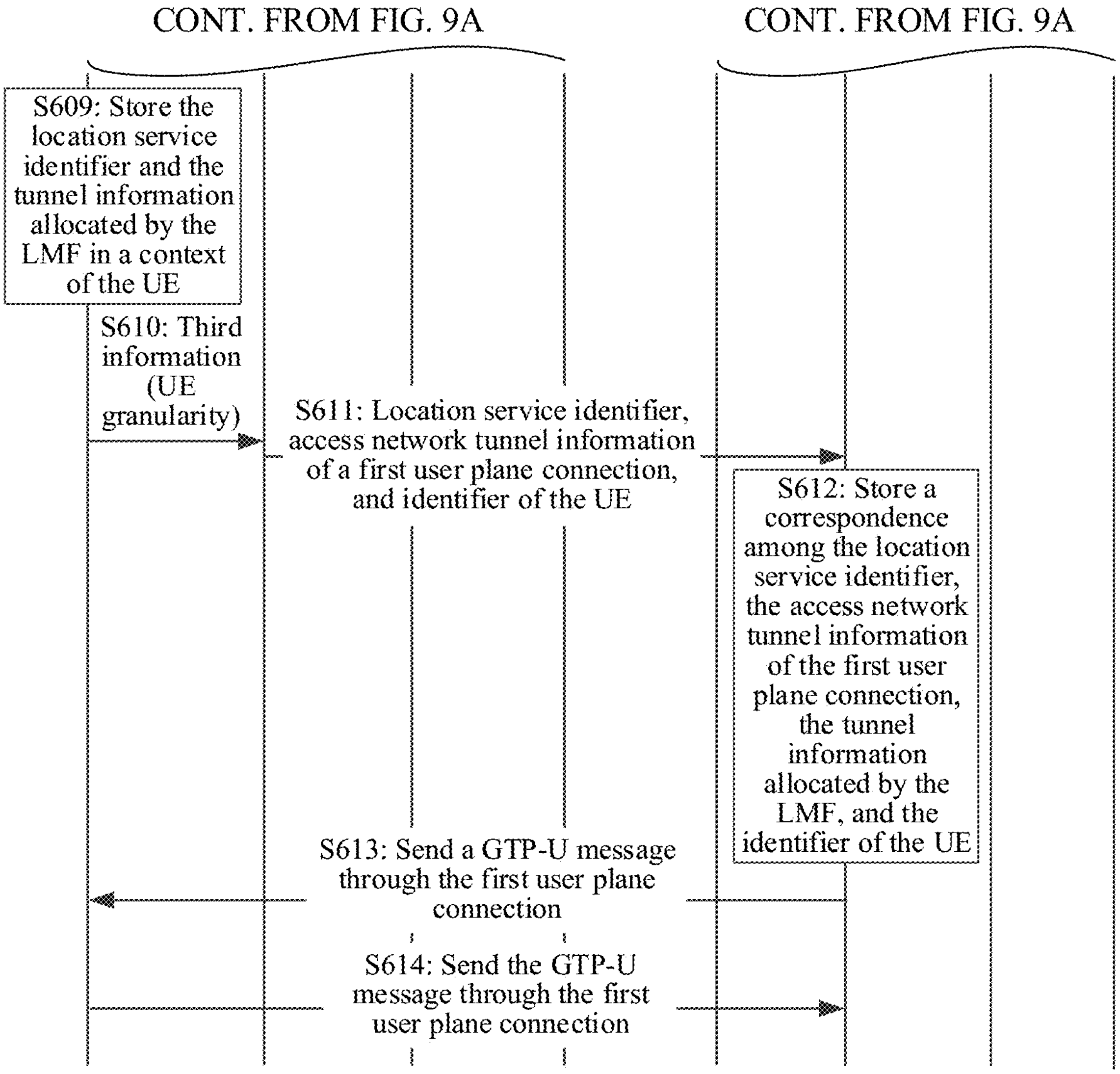
Figure 10A:
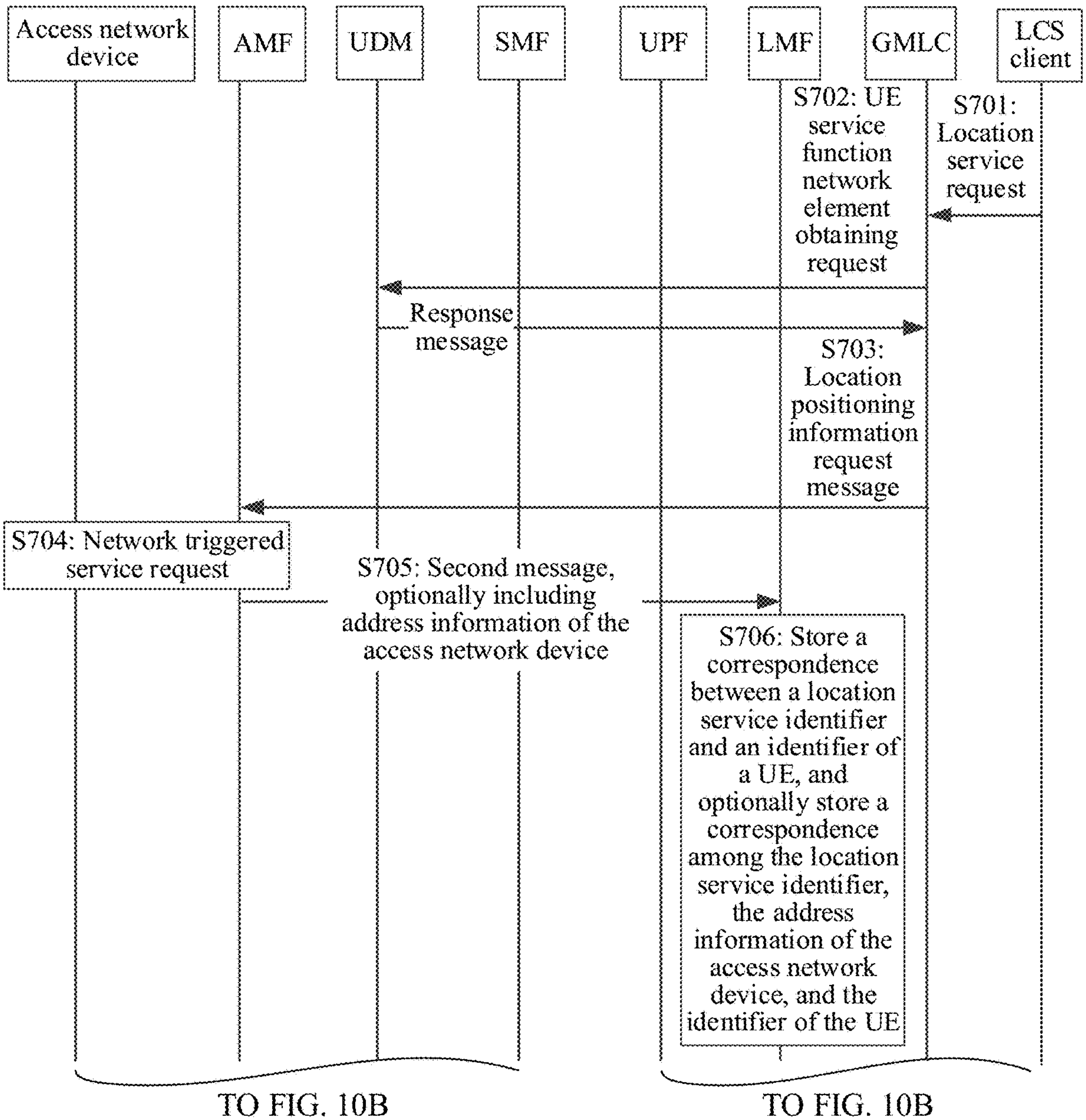
FIG. 10A and FIG. 10B are a schematic flowchart of another communication method according to an embodiment of this application.
Figure 10B:
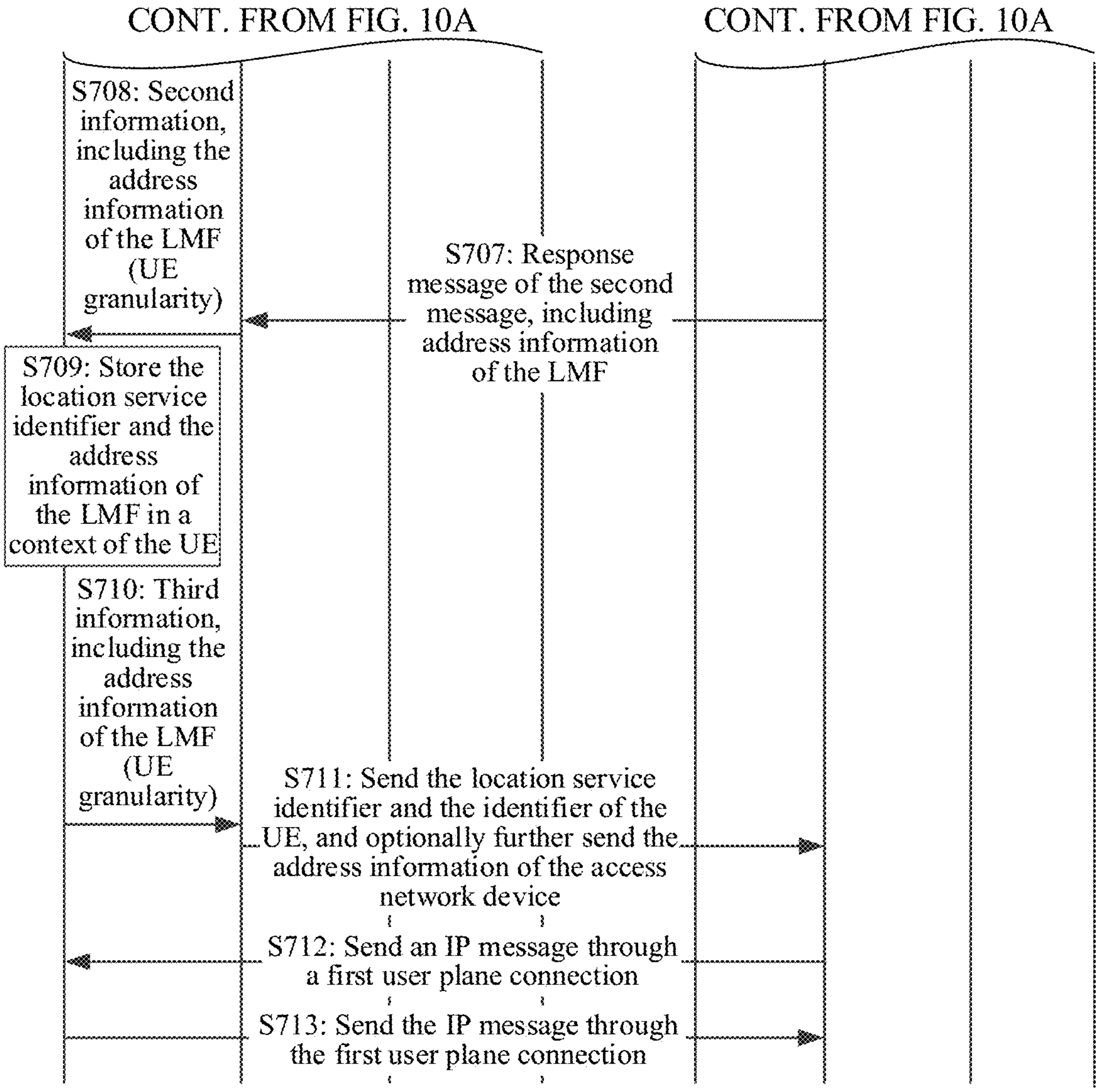
Figure 11A:
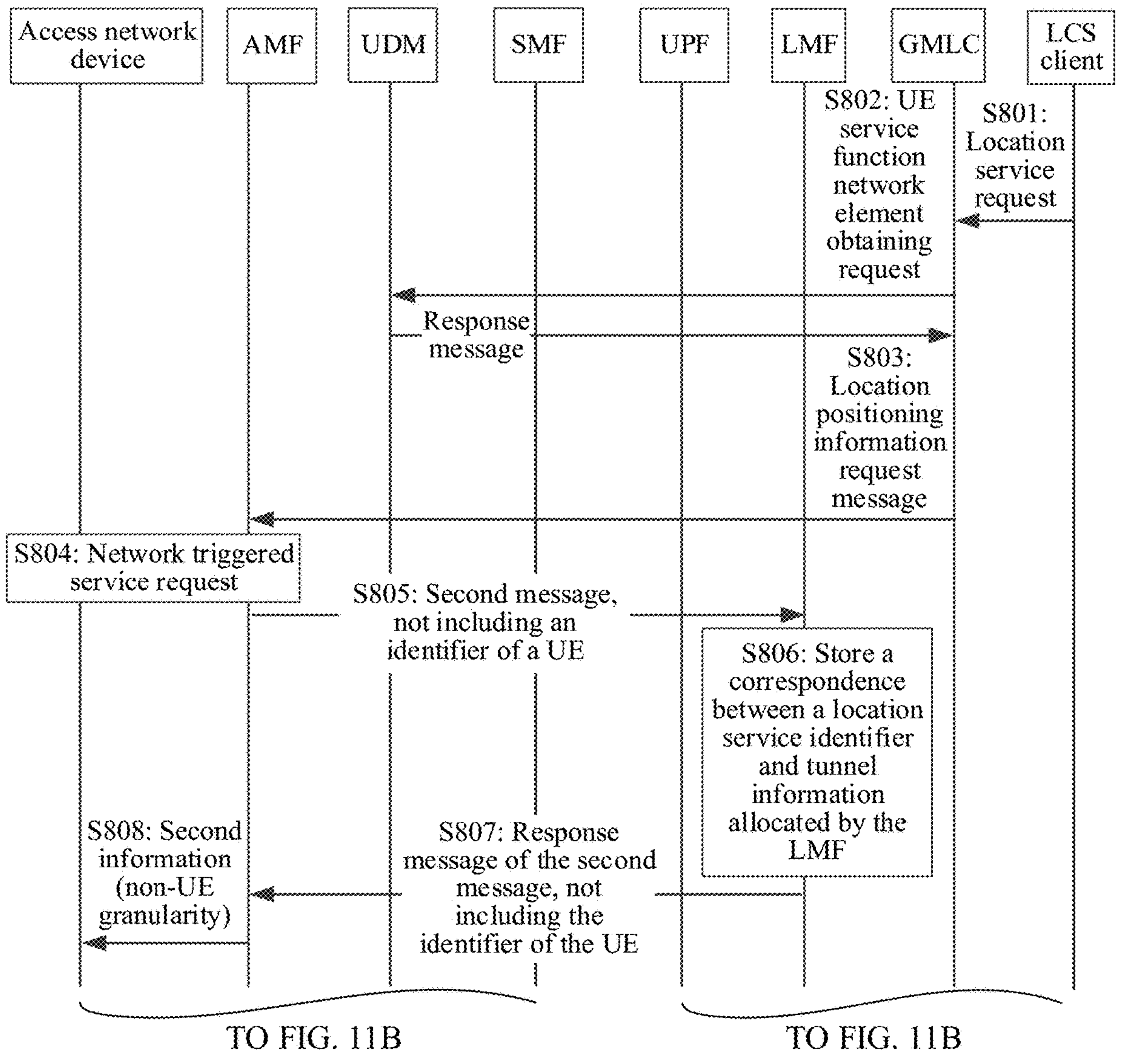
FIG. 11A and FIG. 11B are a schematic flowchart of another communication method according to an embodiment of this application.
Figure 11B:
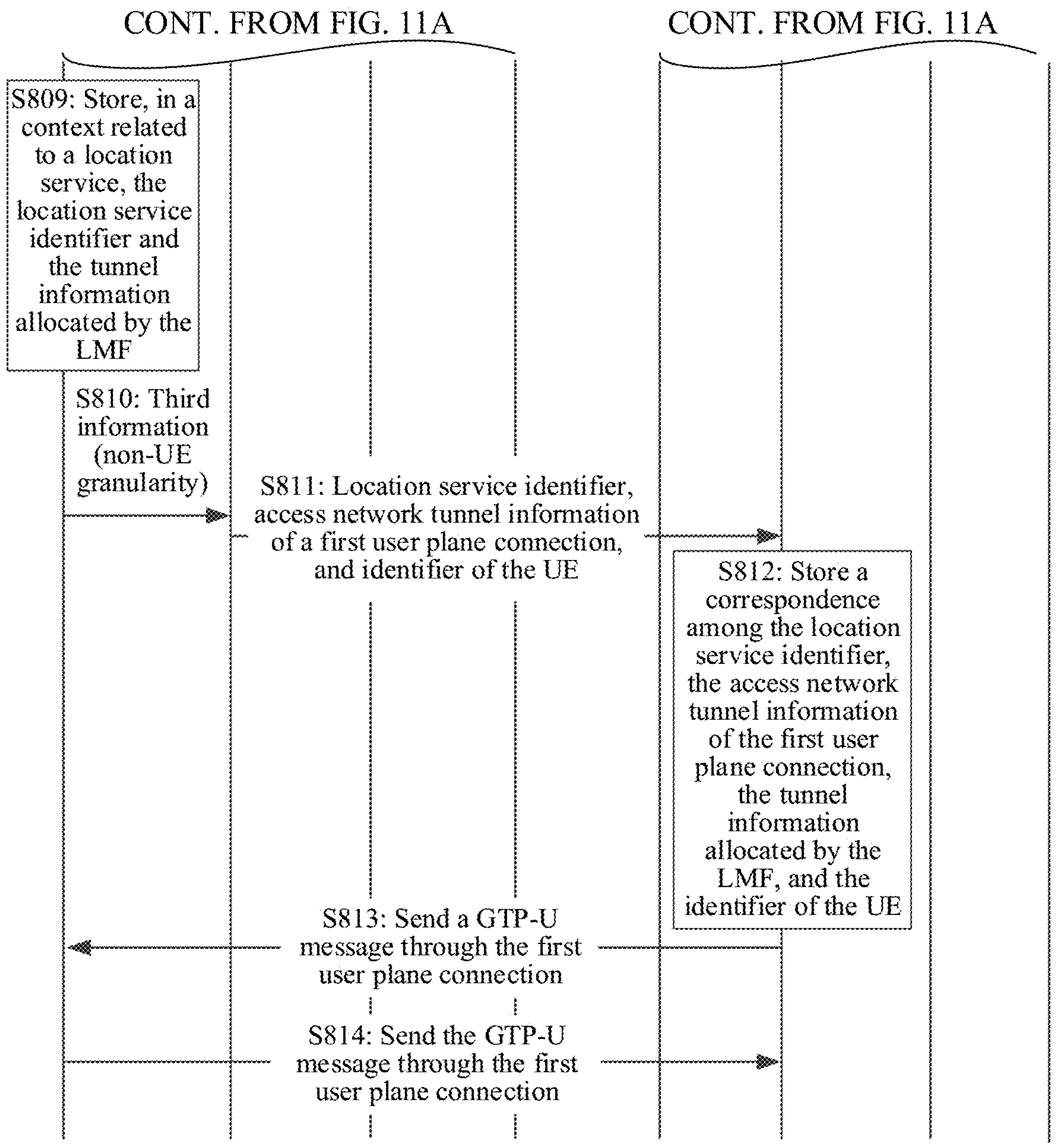
Figure 12A:
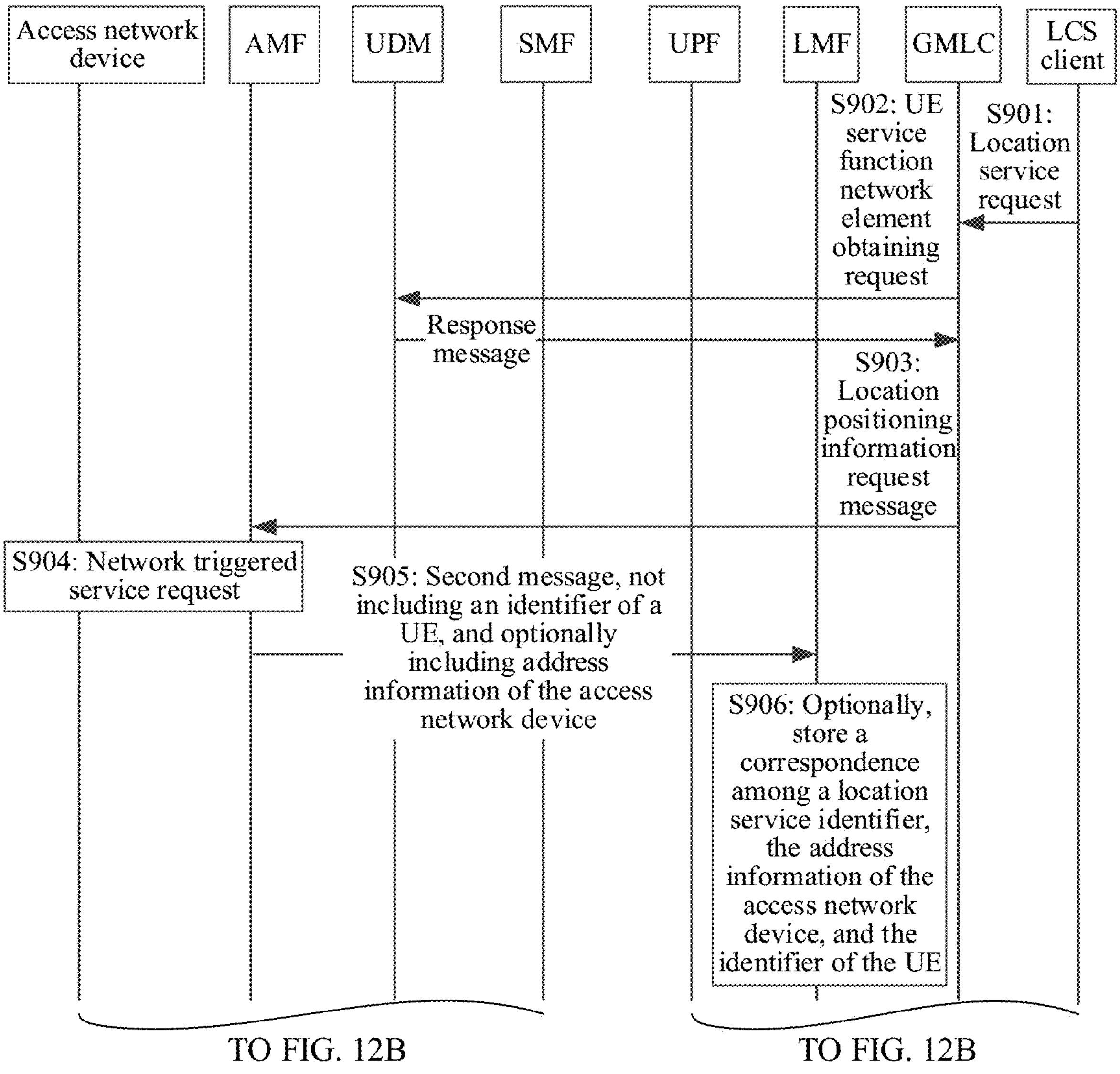
FIG. 12A and FIG. 12B are a schematic flowchart of another communication method according to an embodiment of this application.
Figure 12B:
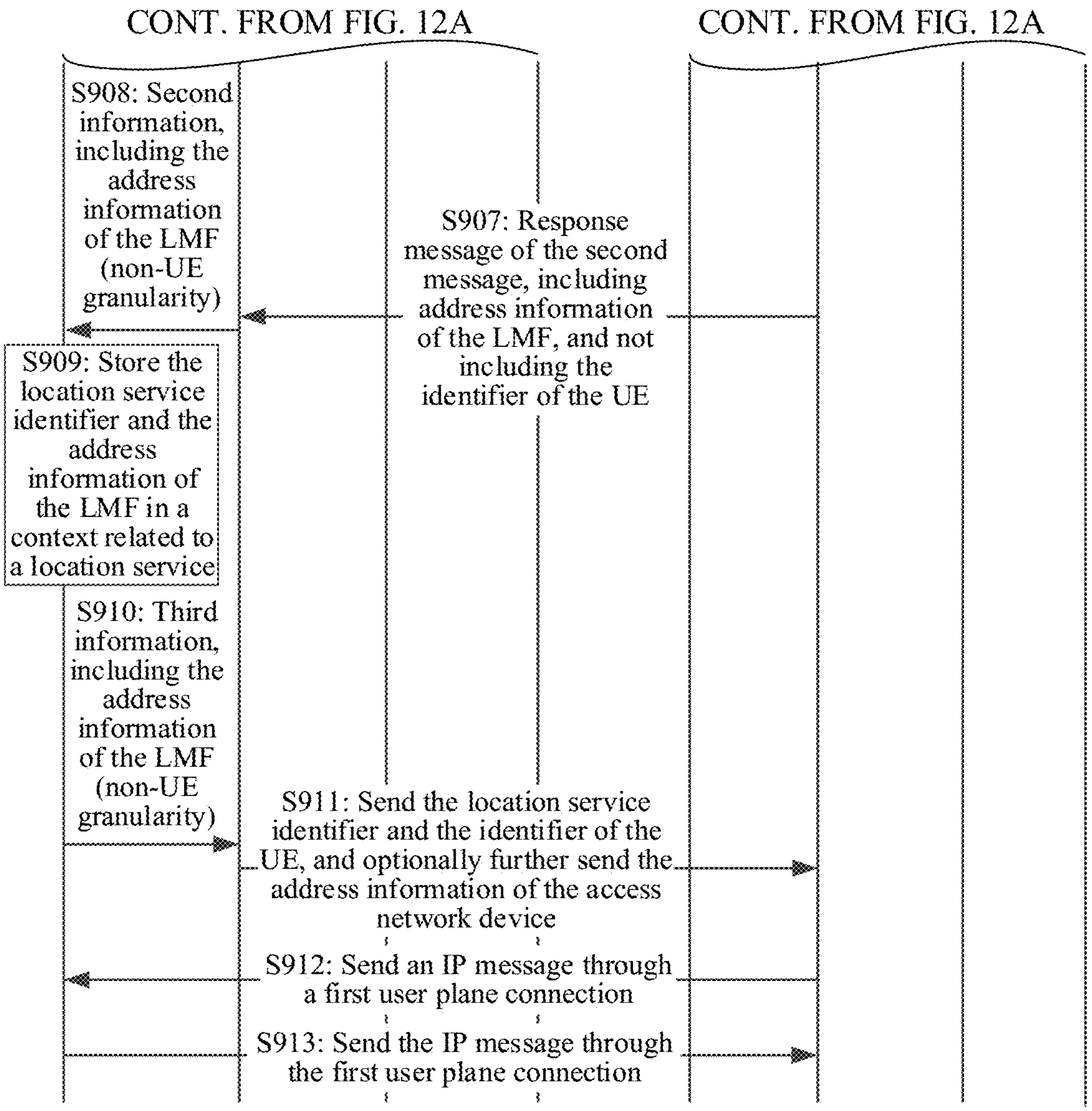

In addition, S102 in the procedure shown in FIG. 4 may correspond to S605 in the procedure shown in FIG. 9A and FIG. 9B, S705 in the procedure shown in FIG. 10A and FIG. 10B, S805 in the procedure shown in FIG. 11A and FIG. 11B, or S905 in the procedure shown in FIG. 12A and FIG. 12B. It can be learned that for the procedures shown in FIG. 5A and FIG. 5B to FIG. 8A and FIG. 8B, both the first core network element and the second core network element are the LMFs.

As shown in FIG. 9A and FIG. 9B, an example in which an access management network element is an AMF, and a first core network element and a second core network element are LMFs is used. A communication method provided in an embodiment of this application may include the following steps.

S601 to S604 are respectively the same as S201 to S204. For details, refer to again.

S605: The AMF sends a second message to an LMF, where the second message may be for requesting to establish a first user plane connection, or the second message may be for selecting a first user plane connection. The first user plane connection is used to transmit positioning information of a UE.

For example, the second message may include a location service identifier, an identifier of the UE, and first information. The location service identifier may include at least one of an LCS correlation ID, an LCS session ID, an eLCS session ID, an eLCS correlation ID, an LCS service ID, a positioning session ID, a location ID, an eLCS service ID, an NRPPa transaction ID, or the like. The location service identifier may alternatively be allocated by the AMF or the LMF. The identifier of the UE may include an SUPI or a GPSI. Optionally, the identifier of the UE may further include a RAN NGAP UE ID and an AMF NGAP UE ID. The first information may be a context identifier (context ID) of a positioning session or a location session used to transmit the positioning information, or may be campus network information (for example, a DNN) and/or slice information (for example, S-NSSAI or NSSAI) corresponding to a positioning session used to transmit the positioning information of the UE, or the first information is an information element specially used to select the first user plane connection used to transmit the positioning information of the UE.

The LMF is related to a location service of the UE. In other words, the LMF is related to the positioning information of the UE. For example, the LMF is configured to: request, receive, and/or process the positioning information of the UE.

S606: The LMF stores a correspondence among the location service identifier, the identifier of the UE, and tunnel information allocated by the LMF.

The tunnel information allocated by the LMF may be tunnel information used by the LMF to perform transmission (or referred to as GTP-U transmission performed by the LMF) through a GTP-U connection (namely, the first user plane connection).

S607: The LMF sends a response message of the second message to the AMF.

The response message may include N2 session management information. The N2 session management information may include the tunnel information allocated by the LMF.

For example, the response message may further include the location service identifier and the identifier of the UE. Optionally, the response message may further include an identifier and/or address information of the UPF, and the address information is, for example, an IP address of the UPF.

In S608, the AMF sends second information to an access network device by using a UE granularity or UE associated message, for example, a UE granularity or UE associated N2 message. For example, the AMF sends, through an NGAP connection of the UE, the UE granularity or UE associated N2 message that includes the location service identifier. The UE granularity or UE associated N2 message may include N2 SM information, and the N2 SM information may include the tunnel information allocated by the LMF.

S609: The access network device receives the N2 message, and stores, in a context of the UE, the location service identifier and the tunnel information allocated by the LMF. For example, the context of the UE may be an NGAP UE context.

S610: The access network device sends third information to the AMF. The third information includes the location service identifier and access network tunnel information of the first user plane connection, for example, AN tunnel Info.

In S610, the access network device may send, to the AMF, the UE granularity or UE associated N2 message that includes the location service identifier. The N2 message may further carry the N2 SM information, and the N2 SM message may include the AN tunnel Info allocated by the access network device.

S611: The AMF sends the location service identifier, the access network tunnel information of the first user plane connection, and the identifier of the UE to the LMF.

Optionally, the AMF may send, to the LMF, a location measurement request that carries the location service identifier, the access network tunnel information of the first user plane connection, and the identifier of the UE.

S611 may alternatively be replaced as follows: The AMF sends third information to the SMF. The third information may be included in the location measurement request. The third information may include the location service identifier, the access network tunnel information of the first user plane connection, and the identifier of the UE.

Optionally, if NGAP ID information of the UE is not included in S605, the AMF NGAP UE ID and the RAN NGAP UE ID may be further included in S611.

S612: The LMF stores a correspondence among the location service identifier, the access network tunnel information of the first user plane connection, the tunnel information allocated by the LMF, and the identifier of the UE.

S613: The LMF sends an NRPPa message, an LPP message, an NRP message, an NRAPP message, a PP message, an NRAPP message, or an NPP message to the access network device through the first user plane connection.

For example, the NRPPa, the LPP message, the NRP message, the NRAPP message, the PP message, the NRAPP message, or the NPP message may be carried in a GTP-U message. In FIG. 9A and FIG. 9B, an example in which the NRPPa message, the LPP message, the NRP message, the NRAPP message, the PP message, the NRAPP message, or the NPP message is carried in the GTP-U message is used. An extended header or a payload of the GTP-U message may carry the location service identifier and the identifier of the UE. Optionally, a payload part of the GTP-U message is, for example, the NRPPa message, the LPP message, the NRP message, the NRAPP message, the PP message, the NRAPP message, or the NPP message. The identifier of the UE may include the at least one of the SUPI, the GPSI, and an NGAP UE ID.

The NRPPa message, the LPP message, the NRP message, the NRAPP message, the PP message, or the NRAPP message, or the NPP message may carry the positioning information of the UE. Optionally, the positioning information may be used to determine a positioning measurement result of a terminal device.

S614: The access network device sends the NRPPa message, the LPP message, the NRP message, the NRAPP message, the PP message, the NRAPP message, or the NPP message to the LMF through the first user plane connection.

For example, the NRPPa, the LPP message, the NRP message, the NRAPP message, the PP message, the NRAPP message, or the NPP message is carried in the GTP-U message. In FIG. 9A and FIG. 9B, an example in which the NRPPa message, the LPP message, the NRP message, the NRAPP message, the PP message, the NRAPP message, or the NPP message is carried in the GTP-U message is used.

Similar to S613, the extended header or the payload of the GTP-U message may carry the location service identifier and the identifier of the UE. Optionally, the payload part of the GTP-U message is, for example, the NRPPa message. The identifier of the UE may include the at least one of the SUPI, the GPSI, and the NGAP UE ID.

For example, the NRPPa message, the LPP message, the NRP message, the NRAPP message, the PP message, the NRAPP message, or the NPP message may include the positioning measurement result of the terminal device obtained by the access network device or the terminal device through measurement.

Based on this procedure shown in FIG. 9A and FIG. 9B, the positioning information of the UE is sent through the first user plane connection between the access network device and the LMF. The first user plane connection may be the GTP-U connection. The first user plane connection is at a UE granularity or UE associated. To be specific, positioning information of different UEs is sent through different first user plane connections. The positioning information of the UE may be carried in the NRPPa message, the LPP message, the NRP message, the NRAPP message, the PP message, the NRAPP message, or the NPP message. For example, the positioning information may include positioning information sent by the LMF, and may further include the positioning measurement result sent by the access network device.

As shown in FIG. 10A and FIG. 10B, an example in which an access management network element is an AMF is still used, and when both a first core network element and a second core network element are LMFs, another communication method provided in an embodiment of this application may include the following steps.

S701 to S704 are respectively the same as S201 to S204. For details, refer to descriptions in the procedure shown in FIG. 5A and FIG. 5B. Details are not described herein again.

S705: The AMF sends a second message to the LMF, where the second message may be for requesting to establish a first user plane connection. The first user plane connection is used to transmit positioning information of a UE.

For example, the second message includes a location service identifier and an identifier of the UE. Optionally, the second message may further include address information of an access network device, for example, an IP address.

For example, in a power-on process of the access network device, the address information of the access network device is reported to the AMF through an initialization procedure (for example, an NG setup procedure). Alternatively, the address information of the access network device, for example, the IP address, may alternatively be configured in the AMF in a configuration manner.

S706: The LMF stores a correspondence among the location service identifier, the address information of the access network device, and the identifier of the UE.

S707: The LMF sends a response message of the second message to the AMF.

The response message may include N2 session management information. The N2 session management information may include the location service identifier and the identifier of the UE. Optionally, the N2 session management information may further include address information of the LMF, for example, an IP address of the LMF.

S708: The AMF sends second information to the access network device, where the second information includes the location service identifier and the address information of the LMF.

In S708, the AMF sends the second information to the access network device by using a UE granularity or UE associated message, for example, a UE granularity or UE associated N2 message. For example, the AMF sends, through an NGAP connection of the UE, the UE granularity or UE associated N2 message that includes the location service identifier. The UE granularity or UE associated N2 message may include N2 SM information, and the N2 SM information may include the address information of the LMF.

S709: The access network device receives the N2 message, and stores the location service identifier and the address information of the LMF in a context of the UE.

For example, the context of the UE may be an NGAP UE context.

S710: The access network device sends third information to the AMF. The third information includes the location service identifier.

In S710, the access network device may send, to the AMF, the UE granularity or UE associated N2 message that includes the location service identifier. The N2 message may further carry the N2 SM information. The N2 SM information may include related access network configuration information used for positioning measurement.

S711: The AMF sends the location service identifier and the identifier of the UE to the LMF.

Optionally, if the second information in step 705 does not include the address information of the access network device, the AMF may send the location service identifier, the address information of the access network device, and the identifier of the UE to the LMF in S711.

For example, the AMF may send, to the LMF, a location measurement request that carries the location service identifier and the identifier of the UE, and optionally further includes the address information of the access network device.

S611 may alternatively be replaced as follows: The AMF sends third information to the SMF. The third information may be included in the location measurement request. The third information may include the location service identifier and the identifier of the UE, and optionally further include the address information of the access network device.

S712: The LMF sends, to the access network device through the first user plane connection, an IP message that includes an NRPPa message, an LPP message, an NRP message, an NRAPP message, a PP message, an NRAPP message, or an NPP message.

An extended header or a payload of the IP message may carry the location service identifier and the identifier of the UE. Optionally, a payload part of the IP message is, for example, the NRPPa message, the LPP message, the NRP message, the NRAPP message, the PP message, the NRAPP message, or the NPP message. The identifier of the UE may include at least one of an SUPI, a GPSI, and an NGAP UE ID.

The NRPPa message, the LPP message, the NRP message, the NRAPP message, the PP message, or the NRAPP message, or the NPP message may carry the positioning information of the UE. Optionally, the positioning information may be used to determine a positioning measurement result of a terminal device.

S713: The access network device sends, to the LMF through the first user plane connection, an IP message that includes the NRPPa message, the LPP message, the NRP message, the NRAPP message, the PP message, the NRAPP message, or the NPP message.

Similar to S712, the extended header or the payload of the IP message may carry the location service identifier and the identifier of the UE. Optionally, a payload part of a GTP-U message is, for example, the NRPPa message, the LPP message, the NRP message, the NRAPP message, the PP message, the NRAPP message, or the NPP message. The identifier of the UE may include the at least one of the SUPI, the GPSI, and the NGAP UE ID.

For example, the NRPPa message, the LPP message, the NRP message, the NRAPP message, the PP message, the NRAPP message, or the NPP message may include the positioning measurement result of the terminal device obtained by the access network device or the terminal device through measurement.

It can be learned that, a difference from this procedure shown in FIG. 9A and FIG. 9B lies in that in this procedure shown in FIG. 10A and FIG. 10B, the positioning information of the UE is sent through the first user plane connection between the access network device and the LMF, and the first user plane connection is an IP connection.

As shown in FIG. 11A and FIG. 11B, an example in which an access management network element is an AMF is still used, and when both a first core network element and a second core network element are LMFs, another communication method provided in an embodiment of this application may include the following steps.

S801 to S804 are respectively the same as S601 to S604. For S801 to S804, refer to descriptions in the procedure shown in FIG. 9A and FIG. 9B. Details are not described herein again.

S805 to S807 are respectively similar to S605 to S607. Therefore, for S805 to S807, refer to descriptions in the procedure shown in FIG. 9A and FIG. 9B. A difference lies in that a second message sent by the AMF to the LMF in S805 does not include an identifier of a UE. In S806, the LMF stores a correspondence between a location service identifier and tunnel information allocated by the LMF. In addition, in S807, a response message that is of the second message and that is sent by the LMF to the AMF does not include the identifier of the UE.

S808 to S814 are respectively the same as S608 to S614. For S808 to S814, refer to descriptions in the procedure shown in FIG. 9A and FIG. 9B. Details are not described herein again.

It can be learned that a difference between this procedure shown in FIG. 11A and FIG. 11B and the procedure shown in FIG. 9A and FIG. 9B lies in that a first user plane connection in the procedure shown in FIG. 11A and FIG. 11B is at a location service granularity rather than a UE granularity or being UE associated. To be specific, positioning information of different UEs and/or positioning information of different LCS services may all be transmitted through a same first user plane connection, thereby improving performance of transmitting the positioning information.

In addition, in the procedure shown in FIG. 11A and FIG. 11B, the first user plane connection is a GTP-U connection between an access network device and the LMF.

As shown in FIG. 12A and FIG. 12B, an example in which an access management network element is an AMF is still used, and when both a first core network element and a second core network element are LMFs, another communication method provided in an embodiment of this application may include the following steps.

S901 to S904 are respectively the same as S701 to S704. For S901 to S904, refer to descriptions in the procedure shown in FIG. 10A and FIG. 10B. Details are not described herein again.

S905 to S907 are respectively similar to S705 to S707. Therefore, for S905 to S907, refer to descriptions in the procedure shown in FIG. 10A and FIG. 10B. A difference lies in that a second message sent by the AMF to the LMF in S905 does not include an identifier of a UE. In S906, the LMF stores a correspondence between a location service identifier and address information of an access network device. In addition, in S907, a response message that is of the second message and that is sent by the LMF to the AMF does not include the identifier of the UE.

S908 to S913 are respectively the same as S708 to S713. For S908 to S913, refer to descriptions in the procedure shown in FIG. 10A and FIG. 10B. Details are not described herein again.

It can be learned that a difference between this procedure shown in FIG. 12A and FIG. 12B and the procedure shown in FIG. 10A and FIG. 10B lies in that a first user plane connection in the procedure shown in FIG. 12A and FIG. 12B is at a location service granularity or a node granularity rather than a UE granularity or being UE associated. To be specific, positioning information of different UEs and/or positioning information of different LCS services may all be transmitted through a same first user plane connection, thereby reducing transmission resource overheads and improving performance of transmitting the positioning information.

In addition, in the procedure shown in FIG. 12A and FIG. 12B, the first user plane connection is an IP connection between the access network device and the LMF.

In the foregoing embodiments provided in this application, solutions of the communication methods provided in embodiments of this application are separately described from perspectives of functional modules or devices and interaction between functional modules or devices. It may be understood that, to implement the foregoing functions, the functional modules or the devices, for example, the access management network element, the first core network element, the second core network element, the third core network element, and the access network device, include corresponding hardware structures and/or software modules for performing the functions. A person of ordinary skill in the art should easily be aware that, in combination with the examples described in embodiments disclosed in this application, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 13:
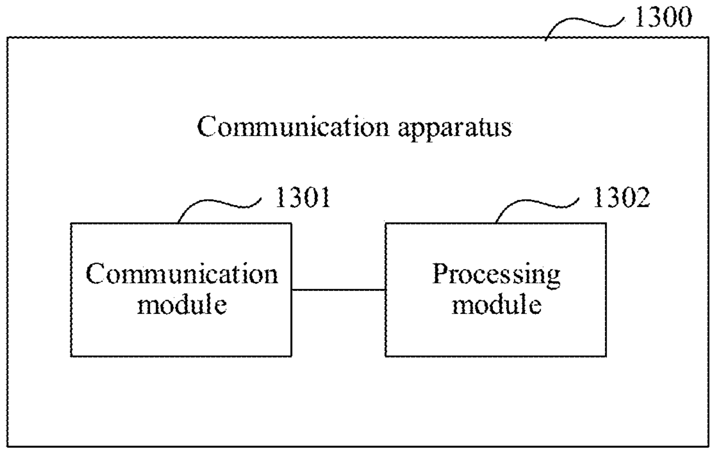
FIG. 13 is a diagram of a structure of a communication apparatus according to an embodiment of this application.

For example, when the functional modules or devices implement the corresponding functions by using the software modules, a communication apparatus provided in an embodiment of this application may be shown in FIG. 13. Refer to FIG. 13. The communication apparatus 1300 may include a communication module 1301 and a processing module 1302. The communication module 1301 is configured to: receive information (a message or data) and/or send information (a message or data) for the communication apparatus 1300. The processing module 1302 is configured to: control and manage an action of the communication apparatus 1300. The processing module 1302 may further control steps performed by the communication module 1301. For example, the communication module 1301 may include a receiving module and/or a sending module.

Optionally, the communication apparatus 1300 may be specifically the access management network element, the first core network element, the second core network element, the third core network element, or the access network device in the foregoing embodiments, or a processor, a chip, a chip system, a functional module, or the like in the access management network element, the first core network element, the second core network element, the third core network element, or the access network device; or the communication apparatus 1300 may be specifically a processor, a chip, a chip system, a functional module, or the like in the access management network element, the first core network element, the second core network element, the third core network element, the access network device in the foregoing embodiments.

In an embodiment, when the communication apparatus 1300 is configured to implement a function of the access management network element in the foregoing embodiments, the communication module 1301 may be configured to receive a first message, where the first message includes a positioning request of a terminal device, or the first message includes a location information request corresponding to a terminal device. The communication module 1301 may be further configured to send a second message to a first core network element, where the second message is for requesting to establish or update a first user plane connection; or the second message is for requesting to select a first user plane connection, the first user plane connection is used to transmit positioning information of the terminal device, and the second message includes a location service identifier.

In a possible implementation, the second message further includes at least one of the following information: an identifier of the terminal device, a session management context identifier, a routing identifier, an address of an access network device, or first information, and the first information indicates a location service.

In a possible implementation, the communication module 1301 may be further configured to send a third message to a second core network element, where the third message is for requesting the positioning information of the terminal device, and the third message includes the location service identifier, or includes the location service identifier and at least one of the following information: the identifier of the terminal device, access network user plane connection information of the first user plane connection, or core network user plane connection information of the first user plane connection.

In a possible implementation, the communication module 1301 may be further configured to receive second information from the first core network element, where the second information includes the location service identifier, or includes the location service identifier and at least one of the following information: the identifier of the terminal device, the core network user plane connection information of the first user plane connection, or a session identifier.

In a possible implementation, the core network user plane connection information of the first user plane connection includes core network tunnel information of the first user plane connection and/or information about a third core network element, and the third core network element is configured to transmit the positioning information to the access network device through the first user plane connection.

In a possible implementation, the communication module 1301 may be further configured to send the second information to the access network device.

In a possible implementation, the communication module 1301 may be further configured to receive third information from the access network device, where the third information includes the location service identifier, or includes the location service identifier and at least one of the following information: the identifier of the terminal device or the access network user plane connection information of the first user plane connection.

In a possible implementation, the communication module 1301 may be further configured to send the third information to the first core network element.

In a possible implementation, the first core network element includes a campus network element.

In an embodiment, when the communication apparatus 1300 is configured to implement a function of the first core network element in the foregoing embodiments, the communication module 1301 may be configured to receive a second message from an access management network element, where the second message is for requesting to establish or update a first user plane connection; or the second message is for requesting to select a first user plane connection, the first user plane connection is used to transmit positioning information of a terminal device, and the second message includes a location service identifier. The communication module 1301 may be further configured to send second information to the access management network element, where the second information includes the location service identifier, or includes the location service identifier and at least one of the following information: an identifier of the terminal device or core network user plane connection information of the first user plane connection.

In a possible implementation, the second message further includes at least one of the following information: the identifier of the terminal device, a session management context identifier, a routing identifier, an address of an access network device, or first information, and the first information indicates a location service.

In a possible implementation, the core network user plane connection information of the first user plane connection includes core network tunnel information of the first user plane connection and/or information about a third core network element, and the third core network element is configured to transmit the positioning information to the access network device through the first user plane connection.

In a possible implementation, the core network user plane connection information of the first user plane connection includes the core network tunnel information; and the communication module 1301 may be further configured to send a fourth message to the third core network element, where the fourth message is used to establish or update the first user plane connection, the fourth message includes the location service identifier, and the third core network element is configured to transmit the positioning information to the access network device through the first user plane connection. The fourth message further includes the core network tunnel information of the first user plane connection. Alternatively, the communication module 1301 may be further configured to receive the core network tunnel information of the first user plane connection from the third core network element.

In a possible implementation, the fourth message includes the location service identifier, or includes the location service identifier and at least one of the following information: the identifier of the terminal device, an identifier of the first core network element or an identifier of a second core network element, or access network user plane connection information of the first user plane connection.

In a possible implementation, the first core network element includes a campus network element.

In an embodiment, when the communication apparatus 1300 is configured to implement a function of the first core network element in the foregoing embodiments, the communication module 1301 may be configured to receive, by the second core network element, a third message from an access management network element, where the third message is for requesting positioning information of a terminal device, and the third message includes a location service identifier, or includes a location service identifier and at least one of the following information: an identifier of the terminal device, access network user plane connection information of a first user plane connection, or core network user plane connection information of a first user plane connection, where the first user plane connection is used to transmit the positioning information of the terminal device. The communication module 1301 may be further configured to send, based on the third message, a fifth message or a sixth message that carries the core network user plane connection information of the first user plane connection.

In a possible implementation, the third message includes the core network user plane connection information of the first user plane connection, and the communication module 1301 may be specifically configured to send the fifth message to the third core network element based on the core network user plane connection information of the first user plane connection, where the fifth message includes the location service identifier, or includes the location service identifier and the at least one of the following information: the identifier of the terminal device, the core network user plane connection information of the first user plane connection, or the access network user plane connection information of the first user plane connection.

In a possible implementation, the third message includes the access network user plane connection information of the first user plane connection, and the communication module 1301 may be specifically configured to send the sixth message based on the access network user plane connection information of the first user plane connection, where the sixth message includes the location service identifier, or includes the location service identifier and the identifier of the terminal device.

In an embodiment, when the communication apparatus 1300 is configured to implement a function of the first core network element in the foregoing embodiments, the communication module 1301 may be configured to receive a fourth message from the first core network element, where the fourth message is used to establish or update a first user plane connection, the first user plane connection is used to transmit positioning information of a terminal device, the fourth message includes a location service identifier, and a third core network element is configured to transmit the positioning information to an access network device through the first user plane connection; and the fourth message further includes core network tunnel information of the first user plane connection; or the method further includes: The third core network element sends the core network tunnel information of the first user plane connection to the first core network element.

In a possible implementation, the fourth message includes the location service identifier, or includes the location service identifier and at least one of the following information:

an identifier of the terminal device, an identifier of the first core network element or an identifier of a second core network element, or access network user plane connection information of the first user plane connection.

In a possible implementation, the communication module 1301 may be further configured to receive a fifth message from the second core network element, where the fifth message is for requesting the positioning information of the terminal device, and the fifth message includes the location service identifier, or includes the location service identifier and at least one of the following information: the identifier of the terminal device, core network user plane connection information of the first user plane connection, or the access network user plane connection information of the first user plane connection. The communication module 1301 may be further configured to send the fifth message to the access network device based on the identifier of the terminal device, the location service identifier, the access network user plane connection information of the first user plane connection, and/or the core network user plane connection information of the first user plane connection.

In a possible implementation, the communication module 1301 may be further configured to send a seventh message to the second core network element based on the identifier of the terminal device, the location service identifier, the access network user plane connection information of the first user plane connection, the core network user plane connection information of the first user plane connection, and/or the identifier of the second core network element.

In an embodiment, when the communication apparatus 1300 is configured to implement a function of the first core network element in the foregoing embodiments, the communication module 1301 may be configured to receive second information from an access management network element, where the second information includes a location service identifier, or includes a location service identifier and at least one of the following information: an identifier of a terminal device or core network user plane connection information of a first user plane connection. The communication module 1301 may be further configured to send a reply message of the fourth message to the first core network element, where the fourth message or the reply message includes core network tunnel information of the first user plane connection.

It should be noted that in embodiments of this application, division into the modules in the communication apparatus is an example, and is merely a logical function division. In actual implementation, another division manner may be used. Functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in the form of a software product. The software product is stored in a storage medium and includes several instructions for instructing a computer device (which may be a personal computer, a server, a network device, or the like) or a processor to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

Figure 14:
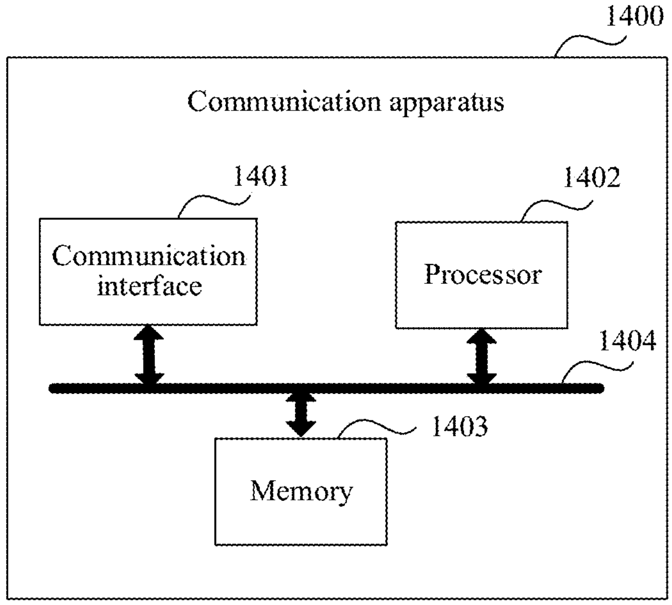
FIG. 14 is a diagram of a structure of another communication apparatus according to an embodiment of this application.

For example, when the functional modules or devices implement the corresponding functions by using the hardware, a communication apparatus provided in an embodiment of this application may be shown in FIG. 14. Refer to FIG. 14. The communication apparatus 1400 may include a communication interface 1401 and a processor 1402. Optionally, the communication apparatus 1400 may further include a memory 1403.

Specifically, the processor 1402 may be a central processing unit (CPU), a network processor (NP), or a combination of a CPU and an NP. The processor 1402 may further include a hardware chip. The hardware chip may be an application-specific integrated circuit (ASIC), a programmable logic device (PLD), or a combination thereof. The PLD may be a complex programmable logic device (CPLD), a field-programmable logic gate array (field-programmable gate array, FPGA), a generic array logic (GAL), or any combination thereof.

The communication interface 1401, the processor 1402, and the memory 1403 are connected to each other. Optionally, the communication interface 1401, the processor 1402, and the memory 1403 are connected to each other by using a bus 1404. The bus 1404 may be a peripheral component interconnect (PCI) bus, an extended industry standard architecture (EISA) bus, or the like. The bus may be classified into an address bus, a data bus, a control bus, or the like. For ease of representation, only one bold line is used to represent the bus in FIG. 14, but this does not mean that there is only one bus or only one type of bus.

In an optional implementation, the memory 1403 is configured to store a program and the like. Specifically, the program may include program code, and the program code includes computer operation instructions. The memory 1403 may include a RAM, and may further include a non-volatile memory, for example, one or more magnetic disk memories. The processor 1402 executes the application program stored in the memory 1403, to implement the foregoing functions, so that a function of the communication apparatus 1400 is implemented.

Optionally, the communication apparatus 1400 may be the access management network element, the first core network element, the second core network element, the third core network element, or the access network device in the foregoing embodiments.

In an embodiment, when the communication apparatus 1400 implements a function of the access management network element (or the AMF) in the embodiments shown in FIG. 4 to FIG. 12A and FIG. 12B, the communication interface 1401 may implement receiving and sending operations performed by the access management network element (or the AMF) in the embodiments shown in FIG. 4 to FIG. 12A and FIG. 12B. The processor 1402 may implement an operation, other than the sending and receiving operations, performed by the access management network element (or the AMF) in the embodiments shown in FIG. 4 to FIG. 12A and FIG. 12B. Specifically, for related specific descriptions, refer to related descriptions in the embodiments shown in FIG. 4 to FIG. 12A and FIG. 12B. Details are not described herein again.

In an embodiment, when the communication apparatus 1400 implements a function of the first core network device (or the SMF) in the embodiments shown in FIG. 4 to FIG. 8A and FIG. 8B, the communication interface 1401 may implement receiving and sending operations performed by the first core network device (or the SMF) in the embodiments shown in FIG. 4 to FIG. 8A and FIG. 8B. The processor 1402 may implement an operation, other than the sending and receiving operations, performed by the first core network device (or the SMF) in the embodiments shown in FIG. 4 to FIG. 8A and FIG. 8B. In addition, when the communication apparatus 1400 implements a function of the LMF in the embodiments shown in FIG. 9A and FIG. 9B to FIG. 12A and FIG. 12B, the communication interface 1401 may implement receiving and sending operations performed by the LMF in the embodiments shown in FIG. 9A and FIG. 9B to FIG. 12A and FIG. 12B. The processor 1402 may implement an operation, other than the sending and receiving operations, performed by the LMF in the embodiments shown in FIG. 9A and FIG. 9B to FIG. 12A and FIG. 12B. Specifically, for related specific descriptions, refer to related descriptions in the embodiments shown in FIG. 4 to FIG. 12A and FIG. 12B. Details are not described herein again.

In an embodiment, when the communication apparatus 1400 implements a function of the second core network device (or the LMF) in the embodiments shown in FIG. 5A and FIG. 5B to FIG. 12A and FIG. 12B, the communication interface 1401 may implement receiving and sending operations performed by the second core network device (or the LMF) in the embodiments shown in FIG. 5A and FIG. 5B to FIG. 12A and FIG. 12B. The processor 1402 may implement an operation, other than the sending and receiving operations, performed by the second core network device (or the LMF) in the embodiments shown in FIG. 5A and FIG. 5B to FIG. 12A and FIG. 12B. Specifically, for related specific descriptions, refer to related descriptions in the embodiments shown in FIG. 4 to FIG. 12A and FIG. 12B. Details are not described herein again.

In an embodiment, when the communication apparatus 1400 implements a function of the third core network device (or the UPF) in the embodiments shown in FIG. 5A and FIG. 5B to FIG. 8A and FIG. 8B, the communication interface 1401 may implement receiving and sending operations performed by the third core network device (or the UPF) in the embodiments shown in FIG. 5A and FIG. 5B to FIG. 8A and FIG. 8B. The processor 1402 may implement an operation, other than the sending and receiving operations, performed by the third core network device (or the UPF) in the embodiments shown in FIG. 5A and FIG. 5B to FIG. 8A and FIG. 8B. Specifically, for related specific descriptions, refer to related descriptions in the embodiments shown in FIG. 5A and FIG. 5B to FIG. 8A and FIG. 8B. Details are not described herein again.

In an embodiment, when the communication apparatus 1400 implements a function of the access network device in the embodiments shown in FIG. 5A and FIG. 5B to FIG. 12A and FIG. 12B, the communication interface 1401 may implement receiving and sending operations performed by the access network device in the embodiments shown in FIG. 5A and FIG. 5B to FIG. 12A and FIG. 12B. The processor 1402 may implement an operation, other than the sending and receiving operations, performed by the access network device in the embodiments shown in FIG. 5A and FIG. 5B to FIG. 12A and FIG. 12B. Specifically, for related specific descriptions, refer to related descriptions in the embodiments shown in FIG. 5A and FIG. 5B to FIG. 12A and FIG. 12B. Details are not described herein again.

Based on the foregoing embodiments, an embodiment of this application provides a communication system. The communication system may include the access management network element, the first core network element, the second core network element, the third core network element, the access network device, or the like in the foregoing embodiments.

An embodiment of this application further provides a computer-readable storage medium. The computer-readable storage medium is configured to store a computer program. When the computer program is executed by a computer, the computer may implement actions implemented by the access management network element, the first core network element, the second core network element, the third core network element, or the access network device in the communication methods provided in the foregoing method embodiments.

An embodiment of this application further provides a computer program product. The computer program product is configured to store a computer program. When the computer program is executed by a computer, the computer may implement actions implemented by the access management network element, the first core network element, the second core network element, the third core network element, or the access network device in the communication methods provided in the foregoing method embodiments.

An embodiment of this application further provides a chip, including a processor. The processor is coupled to a memory, and is configured to invoke a program in the memory, to enable the chip to implement actions implemented by the access management network element, the first core network element, the second core network element, the third core network element, or the access network device in the communication methods provided in the foregoing method embodiments.

An embodiment of this application further provides a chip. The chip is coupled to a memory, and the chip is configured to implement actions implemented by the access management network element, the first core network element, the second core network element, the third core network element, or the access network device in the communication methods provided in the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, and an optical memory) that include a computer-usable program code.

This application is described with reference to the flowcharts and/or the block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Clearly, a person skilled in the art can make various modifications and variations to this application without departing from the protection scope of this application. In this way, if these modifications and variations to this application fall within the scope of the claims of this application and their equivalent technologies, this application is also intended to cover these modifications and variations.

What is claimed is:

1. A method, comprising:

receiving, by an access management network element, a first message, wherein the first message comprises a positioning request of a terminal device, or the first message comprises a location information request corresponding to the terminal device; and sending, by the access management network element, a second message to a first core network element, wherein the second message is configured to request to establish or update a first user plane connection, or the second message is configured to request to select the first user plane connection, wherein the first user plane connection is used to transmit positioning information of the terminal device, and the second message comprises a location service identifier.

2. The method according to claim 1, wherein the second message further comprises at least one of:

an identifier of the terminal device;

a session management context identifier;

a routing identifier;

an address of an access network device; or first information, wherein the first information indicates a location service.

3. The method according to claim 1, further comprising:

sending, by the access management network element, a third message to a second core network element, wherein the third message is configured to request the positioning information of the terminal device, and the third message comprises the location service identifier, or the third message comprises the location service identifier and at least one of the following:
an identifier of the terminal device,
access network user plane connection information of the first user plane connection, or
core network user plane connection information of the first user plane connection.

4. The method according to claim 3, further comprising: receiving, by the access management network element, second information from the first core network element, wherein the second information comprises the location service identifier, or the second information comprises the location service identifier and at least one of the following:
the identifier of the terminal device,
the core network user plane connection information of the first user plane connection, or
a session identifier.

5. The method according to claim 4, wherein the core network user plane connection information of the first user plane connection comprises at least one of:
core network tunnel information of the first user plane connection; or
information about a third core network element, wherein the third core network element is configured to transmit the positioning information to an access network device through the first user plane connection.

6. The method according to claim 4, further comprising sending, by the access management network element, the second information to an access network device.

7. The method according to claim 3, further comprising: receiving, by the access management network element, third information from an access network device, wherein the third information comprises the location service identifier, or the third information comprises the location service identifier and at least one of the following:
the identifier of the terminal device, or
the access network user plane connection information of the first user plane connection.

8. The method according to claim 7, further comprising sending, by the access management network element, the third information to the first core network element.

9. The method according to claim 1, wherein the first core network element comprises a campus network element.

10. A method, comprising:
receiving, by a first core network element, a second message from an access management network element, wherein the second message is configured to establish or update a first user plane connection, or the second message is configured to request to select the first user plane connection, wherein the first user plane connection is used to transmit positioning information of a terminal device, and the second message comprises a location service identifier; and
sending, by the first core network element, second information to the access management network element, wherein the second information comprises the location service identifier, or the second information comprises the location service identifier and at least one of the following:
an identifier of the terminal device, or
core network user plane connection information of the first user plane connection.

11. The method according to claim 10, wherein the second message further comprises at least one of the following:
the identifier of the terminal device;
a session management context identifier;
a routing identifier;
an address of an access network device; or
first information, wherein the first information indicates a location service.

12. The method according to claim 11, wherein the core network user plane connection information of the first user plane connection comprises at least one of:
core network tunnel information of the first user plane connection; or
information about a third core network element, wherein the third core network element is configured to transmit the positioning information to the access network device through the first user plane connection.

13. The method according to claim 12, wherein the core network user plane connection information of the first user plane connection comprises the core network tunnel information; and
the method further comprises:
sending, by the first core network element, a fourth message to the third core network element, wherein the fourth message is configured to establish or update the first user plane connection, the fourth message comprises the location service identifier, and the third core network element is configured to transmit the positioning information to the access network device through the first user plane connection, and
the fourth message further comprises the core network tunnel information of the first user plane connection; or
the method further comprises receiving, by the first core network element, the core network tunnel information of the first user plane connection from the third core network element.

14. The method according to claim 13, wherein the fourth message comprises the location service identifier, or the fourth message comprises the location service identifier and at least one of the following information:
the identifier of the terminal device;
an identifier of the first core network element or an identifier of a second core network element; or
access network user plane connection information of the first user plane connection.

15. The method according to claim 10, wherein the first core network element comprises a campus network element.

16. An apparatus, comprising:
one or more processors; and
a memory coupled to the one or more processors with instructions stored thereon, wherein the instructions, when executed by the one or more processors, enable the apparatus to perform:
receiving a first message, wherein the first message comprises a positioning request of a terminal device, or the first message comprises a location information request corresponding to the terminal device; and
sending a second message to a first core network element, wherein the second message is configured to establish or update a first user plane connection, or the second message is configured to select the first user plane connection, wherein the first user plane connection is used to transmit positioning information of the terminal device, and the second message comprises a location service identifier.

17. The apparatus according to claim 16, wherein the instructions, when executed by the one or more processors, further enable the apparatus to perform:

sending a third message to a second core network element, wherein the third message is configured to request the positioning information of the terminal device, and the third message comprises the location service identifier, or the third message comprises the location service identifier and at least one of the following:

an identifier of the terminal device, access network user plane connection information of the first user plane connection, or core network user plane connection information of the first user plane connection.

18. The apparatus according to claim 17, wherein the instructions, when executed by the one or more processors, further enable the apparatus to perform:

receiving second information from the first core network element, wherein the second information comprises the location service identifier, or the second information comprises the location service identifier and at least one of the following:

the identifier of the terminal device, the core network user plane connection information of the first user plane connection, or a session identifier.

19. The apparatus according to claim 18, wherein the instructions, when executed by the one or more processors, further enable the apparatus to perform:

sending the second information to an access network device.

20. The apparatus according to claim 17, wherein the instructions, when executed by the one or more processors, further enable the apparatus to perform:

receiving third information from an access network device, wherein the third information comprises the location service identifier, or the third information comprises the location service identifier and at least one of the following information:

the identifier of the terminal device, or the access network user plane connection information of the first user plane connection.

* * * * *